United States Patent
Bluhm et al.

(10) Patent No.: US 11,392,284 B1
(45) Date of Patent: Jul. 19, 2022

(54) SYSTEM AND METHOD FOR IMPLEMENTING A DYNAMICALLY STYLABLE OPEN GRAPHICS LIBRARY

(71) Applicants: Conrad Clayton Bluhm, Melbourne Beach, FL (US); Sean Charles Rose, West Melbourne, FL (US); Verner Keith Devlin, West Melbourne, FL (US)

(72) Inventors: Conrad Clayton Bluhm, Melbourne Beach, FL (US); Sean Charles Rose, West Melbourne, FL (US); Verner Keith Devlin, West Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 11 days.

(21) Appl. No.: 16/178,345

(22) Filed: Nov. 1, 2018

(51) Int. Cl.
| | |
|---|---|
| *G06F 3/04847* | (2022.01) |
| *G06F 3/04812* | (2022.01) |
| *G06F 9/451* | (2018.01) |
| *G06F 9/445* | (2018.01) |

(52) U.S. Cl.
CPC ...... *G06F 3/04847* (2013.01); *G06F 3/04812* (2013.01); *G06F 9/44505* (2013.01); *G06F 9/451* (2018.02)

(58) Field of Classification Search
CPC .. G06F 3/04847; G06F 9/451; G06F 3/04812; G06F 9/44505
See application file for complete search history.

(56) References Cited

U.S. PATENT DOCUMENTS

| | | |
|---|---|---|
| 5,872,909 A | 2/1999 | Wilner et al. |
| 5,909,577 A | 6/1999 | Devanbu |
| 6,038,031 A | 3/2000 | Murphy |
| | (Continued) | |

OTHER PUBLICATIONS

Written Opinion and International Search Report for PCT/US2019/065505 dated Mar. 4, 2020.

(Continued)

*Primary Examiner* — Stephen S Hong
*Assistant Examiner* — Ahamed I Nazar
(74) *Attorney, Agent, or Firm* — Tarolli, Sundheim, Covell & Tummino LLP

(57) ABSTRACT

A system to implement a dynamically stylable open graphics library is disclosed. The system includes a memory configured to store machine readable instructions and data and a processing unit. The machine readable instructions and data include a view configuration file that defines view format areas of a graphical user interface where the elements of the graphical user interface are placeable, a layout configuration file that defines a layout of the elements within an area described by the view configuration file on a screen display, a style configuration file that defines a style of the elements, a graphical user interface engine configured to process the style configuration file, the layout configuration file, and the view configuration file and render the elements onto the screen display, and an interface that allows changes to be made to the configuration files by editing a language representative of the format of the configuration files.

16 Claims, 25 Drawing Sheets

(56) References Cited

U.S. PATENT DOCUMENTS

| | | | |
|---|---|---|---|
| 7,996,765 B1* | 8/2011 | Mitnick | G06F 40/14 715/235 |
| 10,805,146 B2 | 10/2020 | Bruckart et al. | |
| 2002/0010909 A1 | 1/2002 | Charisius et al. | |
| 2003/0023956 A1 | 1/2003 | Dulberg et al. | |
| 2003/0214508 A1 | 11/2003 | Aleksic et al. | |
| 2006/0159077 A1 | 7/2006 | Vanecek, Jr. | |
| 2006/0168331 A1 | 7/2006 | Thompson et al. | |
| 2006/0265659 A1* | 11/2006 | Collins | G06F 40/103 715/732 |
| 2007/0112574 A1 | 5/2007 | Greene | |
| 2007/0132779 A1* | 6/2007 | Gilbert | H04L 67/36 345/619 |
| 2007/0147334 A1 | 6/2007 | Guthrie | |
| 2008/0009968 A1 | 1/2008 | Bruemmer et al. | |
| 2008/0091365 A1 | 4/2008 | Tsang et al. | |
| 2008/0177756 A1 | 7/2008 | Kosche et al. | |
| 2009/0037894 A1 | 2/2009 | Unger | |
| 2009/0064106 A1* | 3/2009 | Webster | G06F 8/36 717/120 |
| 2009/0145172 A1 | 6/2009 | Lubert et al. | |
| 2009/0204633 A1* | 8/2009 | Bender | G06F 40/14 |
| 2009/0234903 A1 | 9/2009 | Lomelli et al. | |
| 2010/0168874 A1* | 7/2010 | Lucas | G05B 23/0267 700/17 |
| 2010/0232317 A1 | 9/2010 | Jing et al. | |
| 2011/0216059 A1* | 9/2011 | Espiritu | G06T 19/00 345/419 |
| 2012/0011491 A1 | 1/2012 | Eldar | |
| 2012/0066620 A1* | 3/2012 | Teng | G06F 9/451 715/762 |
| 2012/0131279 A1 | 5/2012 | Ciraula et al. | |
| 2012/0238361 A1 | 9/2012 | Janis et al. | |
| 2012/0254874 A1 | 10/2012 | Siira et al. | |
| 2012/0259909 A1 | 10/2012 | Bachelor et al. | |
| 2013/0011076 A1 | 1/2013 | Obzhirov | |
| 2014/0033026 A1* | 1/2014 | Sheridan | G06T 11/60 715/249 |
| 2014/0201418 A1 | 7/2014 | Turner et al. | |
| 2015/0026687 A1 | 1/2015 | Yim et al. | |
| 2015/0040104 A1* | 2/2015 | Mall | G06F 9/44505 717/121 |
| 2015/0074279 A1 | 3/2015 | Maes et al. | |
| 2015/0128105 A1* | 5/2015 | Sethi | G06F 8/36 717/106 |
| 2015/0205696 A1 | 7/2015 | Hanckel et al. | |
| 2015/0227270 A1* | 8/2015 | Yun | G06F 16/9566 715/202 |
| 2015/0264554 A1 | 9/2015 | Addepalli et al. | |
| 2015/0347108 A1 | 12/2015 | Munshi et al. | |
| 2016/0104204 A1* | 4/2016 | Greenberg | G06F 16/958 705/14.68 |
| 2016/0216072 A1 | 7/2016 | McNeil et al. | |
| 2016/0253908 A1 | 9/2016 | Chambers et al. | |
| 2017/0195458 A1 | 7/2017 | Parekh et al. | |
| 2017/0329730 A1 | 11/2017 | Sadhu | |
| 2017/0364225 A1* | 12/2017 | Hammack | G05B 15/02 |
| 2018/0105271 A1 | 4/2018 | Wypyszynski et al. | |
| 2018/0188747 A1 | 7/2018 | Venturelli | |
| 2018/0212863 A1 | 7/2018 | Akcan et al. | |
| 2019/0034209 A1* | 1/2019 | Donchev | G06F 8/34 |
| 2019/0246289 A1 | 8/2019 | Monga et al. | |

OTHER PUBLICATIONS

Non Final Office Action for U.S. Appl. No. 15/946,180 dated Sep. 16, 2020.

Final Office Action for U.S. Appl. No. 15/901,486 dated Jan. 28, 2021.

Final Office Action for U.S. Appl. No. 15/946,180 dated Mar. 16, 2021.

* cited by examiner

900

```xml
<?xml version="1.0" encoding="UTF-8"?>
    <styles prefix=" " xmlns="cddcstyles "xmlns:xsi=http://www.w3.
        org/2001/XMLSchema-instance" xsi:schemaLocation="cddcstyles styles.xsd">
<!-- ************************************-->
<!-- BASE CONTROL STYLES START-->
<!-- These controls are the standard styles for all elements-->
<!-- NOTE: DO NOT ALTER!!!!!!!!!!!!!!!!!!!!!!!!!!!!!!!!!! -->
<!-- ************************************-->
<!-- Button style start -->
<Style name="button">              902
    <Background>
        <color>0, 0,</color>
    </Background>
    <Border>
        <Color>0, 225, 0</color>
        <Roundcorners>
            <Radius>0.05</Radius>
        </Roundcorners>
        <Size>1</Size>
        <Type>SOLID</Type>
    </Border>
    <Font>
        <Family>SANS SERIF</Family>
        <Size>16</Size>
    </Font>
    <Foregroundcolor>0, 225, 0</Foregroundcolor>
    <Size>
        <Method>ABSOLUTE</Method>
        <Height>0.25</Height>
        <Width>0.9</Width>
    </Size>
    <Textalignment>CENTER</Textalignment>
</Style>
 <Style name="button.disable">
   <Border>
      <Color>51, 51, 51</Color>
      <Roundcorners>
          <Radius>0.05</Radius>
      </Roundcorners>
      <Size>1</Size>
      <Type>SOLID</Type>
   </Border>
   <Foregroundcolor>51, 51, 51</Foregroundcolor>
 </Style>                                   904
<!-- Button style End -->
<!-- Latch Button Style Start-->
<Style name="LatchButton" base="button">
</Style>
 <Style name="LatchButton.disable" base="button.disable">
     <Background>
        <color>0, 0, 0</color>
     </Background>
     <Border>
        <Color>51, 51, 51</Color>
        <Roundcorners>
            <Radius>0.05</Radius>
        </Roundcorners>
        <Size>1</Size>
        <Type>SOLID</Type>
     </Border>
     <Foregroundcolor>51, 51, 51</Foregroundcolor>
 </Style>
```

```
<Style name="button">
    <Background>
        <color>33, 150, 243</color>
    </Background>
    <Border>                     931
        <color>33, 150, 243</color>
        <Roundcorners>
            <radius>0.0625</Radius>
        </Roundcorners>          932
        <Size>1</Size>
        <Type>SOLID</Type>
    </Border>
    <Font>                       933
        <Family>SANS SERIF</Family>
        <Emphasis>BOLD</Emphasis>
        <Size>16</Size>          934
    </Font>                      935
    <Foregroundcolor>255, 255, 255</Foregroundcolor>
    <Padding>
        <Size>0.05</Size>
    </Padding>
    <Size>
        <Method>ABSOLUTE</Method>
        <Height>0.25</Height>
        <Width>1.0</Width>
    </Size>                      936
    <Textalignment>CENTER</Textalignment>
</Style>
```

PRODUCES ⇒ BRAVO — 930

FIG. 9B

```
<Style name="checkButton">
    <Border>
        <Roundcorners>
            <Radius>0.0625</Radius>
        </Roundcorners>
    </Border>
    <Font>
        <Family>SANS SERIF</Family>
        <Size>16</Size>
    </Font>
    <Foregroundcolor>255, 255, 255</Foregroundcolor>
    <Padding>
        <Sizeleft>0.1</Sizeleft>
    </Padding>
    <Size>
        <Method>ABSOLUTE</Method>
        <Height>0.375</Height>
        <Width>1.5</Width>
    </Size>
</Style>
 <Style name="checkButton.disable">
    <Foregroundcolor>89, 89, 89</Foregroundcolor>
<Style>
<Style name="checkButton.uncheckFocus">
    <Border>
      <Color>0, 225, 225</color>
        <Roundcorners>
            <radius>0.0625</Radius>
        </Roundcorners>
        <Size>1</Size>
        <Type>SOLID</Type>
    </Border>
</Style>
```

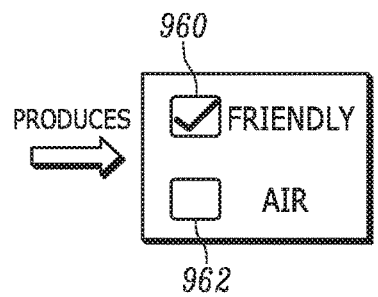

FIG. 9C

```xml
<Style name="spinControl">
    <Background>
        <Color>33, 150, 234</Color>
    </Background>
    <Border>
        <Roundcorners>
            <Radius>0.625</Radius>
        </Roundcorners>
    </Border>
    <Font>
        <Family>SANS SERIF</Family>
        <Emphasis>BOLD</Emphasis>
        <Size>16</Size>
    </Font>
    <Foregroundcolor>255, 255, 255</Foregroundcolor>
    <Padding>
        <Size>0.0625</Size>
    </Padding>
    <Size>
        <Method>ABSOLUTE</Method>
        <Height>0.25</Height>
        <Width>1</Width>
    </Size>
    <Textalignment>CENTER</Textalignment>
</Style>
<Style name="spinControl.focus">
    <Background>
        <Color>9, 94, 164</Color>
    </Background>
    <Border>
        <color>0, 255, 255</color>
        <Roundcorners>
            <Radius>0.0625</Radius>
        </Roundcorners>
        <Type>SOLID</Type>
    </Border>
    <Foregroundcolor>255, 255, 255</Foregroundcolor>
</Style>
<Style name="spinControl.button.arrow">
    <Background>
        <Color>255, 255, 255</Color>
    </Background>
    <Size>
        <Method>ABSOLUTE</Method>
        <Height>0.125</Height>
        <Width>0.125</Width>
    </Size>
</Style>
```

975 — 981, 982, 983

PRODUCES → 980 BRIGHTNESS ◄ 50 ►

FIG. 9D

```
<Listctrl id="SARTaskList" data="SARTasks" uuidkey="m_id.uuid" style="sarHalfListCtrl" iconkey="Texture">
    <column>
        <head>STATE</head>
        <Value>${data:TaskstateAbbreviation}</Value>
    </column>
    <column>
        <head>TIME</head>
        <Value>${data:StartTimestring}</Value>
    </column>
    <column>
        <head>ID</head>
        <Value>${data:m_id.description}</Value>
    </column>
</Listctrl>
```

1408 1402 1404 (labels pointing to code)

```
<!-- Row -->
<TextLabel id="LSTStatusLabel" style="o-data-label--small">
    <DefaultText>STATE</DefaultText>
</TextLabel>
<TextLabel id="StatusDetail" style="sarHalfDataText">
    <DefaultText>${data: SARTaskList.Selected.TaskStateString}</DefaultText>
</TextLabel>
```

1408 1406 (labels)

FIG. 14

```
REFLECTION_CLASS (SARTask)
    REFLECT_BASE (BaseTask)
    REFLECT_VAR_D (capability, "Associated SAR capability")
    REFLECT_VAR_D (frequency, "Frequency to use for the task")
    REFLECT_VAR_D (precedence, "Precedence state of the task")
    REFLECT_VAR_D (resolution, "Desired image resolution in meters/pixel")
    REFLECT_VAR_D (subcapability, "Subcapability associated with the task")
    REFLECT_VAR_D (targetType, "Target type for the task")
    REFLECT_VAR_D (targetID, "UUID for the target entity, loc, or zone")
    REFLECT_VAR_D (offboardwilco, "indicates wilco notification status of an offboard SAR task")
    REFLECT_VAR_D (hasTime, "Flag to indicate execution time field is filled")
    REFLECT_VAR_D (m_taskAchievability, "The achievability of the task iteself")
REFLECTION_CLASS_END()
```

1500

```
GlobaldataBindings::getInstance().bindlist("SARTasks", publisher.getMap());
```

Property File

```
##Mission Plane Route Component
component.missionplan.route.routedetails.latitude=LAT
component.missionplan.route.routedetails.latitude.unit=DEG
component.missionplan.route.routedetails.longitude=LONG
component.missionplan.route.routedetails.longitude.unit=DEG
component.missionplan.route.routedetails.elevation=ELEV
component.missionplan.route.routedetails.elevation.unit=FT
component.missionplan.route.routedetails.magnetic_variantion=MAGV
component.missionplan.route.routedetails.magnetic_variantion.unit=
component.missionplan.route.routedetails.wind=WIND
component.missionplan.route.routedetails.wind.unit=
component.missionplan.route.routedetails.task=TASK
component.missionplan.route.routedetails.task.unit=
component.missionplan.route.routedetails.oap=OAP
component.missionplan.route.routedetails.oap.unit=
component.missionplan.route.routedetails.fix=FIX
component.missionplan.route.routedetails.fix.unit=
component.missionplan.route.routedetails.rnp=RNP
component.missionplan.route.routedetails.rnp.unit=
component.missionplan.route.routedetails.e_l=E/L
component.missionplan.route.routedetails.e_l.unit=
component.missionplan.route.routedetails.fuel=FUEL
component.missionplan.route.routedetails.fuel.unit=LB
```

FIG. 17

SYSTEM AND METHOD FOR IMPLEMENTING A DYNAMICALLY STYLABLE OPEN GRAPHICS LIBRARY

TECHNICAL FIELD

This relates to software systems for implementing graphical user interfaces, or more particularly to a system and method for implementing a dynamically stylable open graphics library.

BACKGROUND

Graphical user interfaces (GUIs) allow users to interact with electronic devices through graphical icons and visual indicators. Actions within a GUI are commonly performed by directly manipulating graphical elements such as windows, menus, and icons on a display. In a flight deck environment, the graphical user interface conveys information to a user (e.g., a pilot) including telltale indicators such as fuel level, altitude, and mission status. A GUI builder or a GUI designer is a software development tool that facilitates the creation of GUIs by allowing a user experience designer to arrange control elements using a drag and drop editor. User interfaces are typically programmed using an event-driven architecture in which supporting code connects control elements with application logic.

SUMMARY

In one example, a system to implement a dynamically stylable open graphics library is disclosed. The system includes a memory configured to store machine readable instructions and data and a processing unit configured to access the memory and execute the machine-readable instructions. The machine readable instructions and data include a view configuration file that defines view format areas of a graphical user interface where the elements of the graphical user interface are placeable, a layout configuration file that defines a layout of the elements within an area described by the view configuration file on a screen display, a style configuration file that defines a style of the elements, a graphical user interface engine configured to process the style configuration file, the layout configuration file, and the view configuration file, and render the elements onto the screen display, and an interface, the interface allowing changes to be made to the style configuration file, the layout configuration file, and/or the view configuration file by editing a language representative of the format of the view configuration file, the layout configuration file, and the style configuration file.

In another example, a method for dynamically changing elements within a graphical user interface (GUI) during runtime is disclosed. The method includes changing a style configuration file, a layout configuration file, or a view configuration file while a GUI application is executing, actuating an actuation control during runtime, implementing a runtime reload of the style configuration file, the layout configuration file, or the view configuration file that has been changed in response to actuation of the actuation control, and determining a style of the elements to create a runtime-configured display of styled elements on a GUI screen display.

In yet another example, a non-transitory computer readable medium to implement a dynamically stylable open graphics library is disclosed. The system includes a view configuration file that defines view format areas of a graphical user interface where the elements of the graphical user interface are placeable, a layout configuration file that defines a layout of the elements within an area described by the view configuration file on a screen display, a style configuration file that defines a style of the elements, and a graphical user interface engine configured to process the style configuration file, the layout configuration file, and the view configuration file and render the elements onto the screen display, and an actuation control, wherein actuating the actuation control during runtime implements a runtime load of the style configuration file, the layout configuration file, and/or the view configuration file that have been changed to create a runtime-configured display on the screen display.

BRIEF DESCRIPTION OF THE DRAWINGS

FIG. 9A is an example style file for a dynamically stylable open graphics library.

FIG. 9B is another example style file for a dynamically stylable open graphics library.

FIG. 9C is another example style file for a dynamically stylable open graphics library.

FIG. 9D is another example style file for a dynamically stylable open graphics library.

FIG. 14 illustrates example data binding syntax for a dynamically stylable open graphics library system.

FIG. 15 illustrates an example reflection file used within a dynamically stylable open graphics library system.

FIG. 17 is an example property file used by the disclosed dynamically stylable open graphics library system.

DETAILED DESCRIPTION

Figure 1:
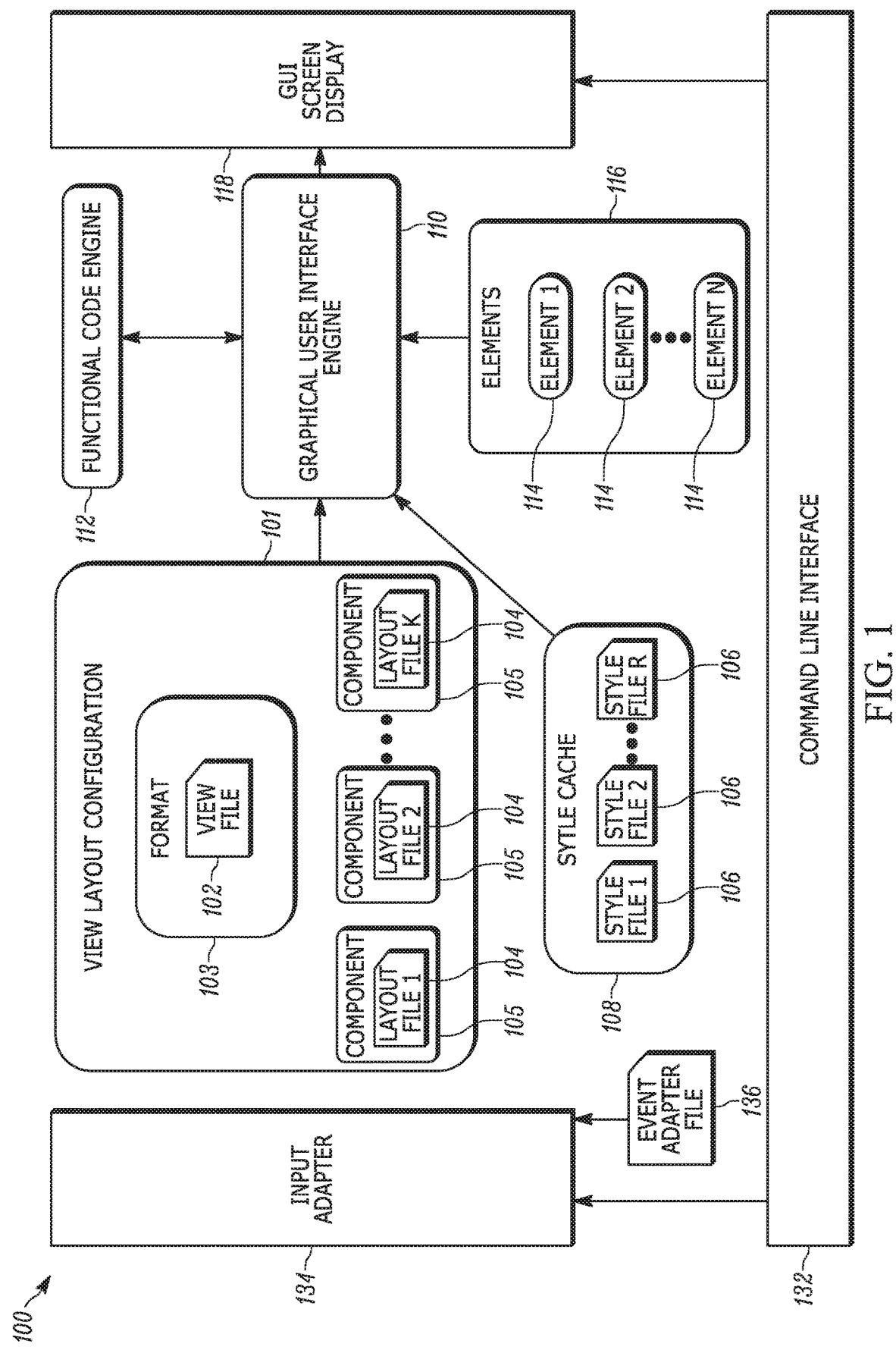
FIG. 1 is an architecture diagram of a system that implements a dynamically stylable open graphics library.

Disclosed herein is a system and method to implement a dynamically stylable open graphics library. The system allows a user to change the user experience (user interface) in real-time, in the run-time environment, without the need to modify, recertify, or recompile backend core software. To implement a runtime display change, the user changes one or more configuration files. The user then actuates an actuation control to reload the changed configuration files during runtime, the elements on the graphical user interface change styles in accordance with the change to the configuration files.

In computing, dynamic loading (or runtime loading) is the process by which a computer program, during execution time (runtime), loads a library or other binary into memory, retrieves the addresses of functions and variables contained in the library, executes those functions or accesses those variables, and unloads the library from memory. Thus, a runtime load implemented by the system disclosed herein will update a graphical user interface (GUI) display while an application is executing based on a current configuration of a number of configuration files that define a format for the display. Typically, the system is loaded by actuating (e.g., by a user) an actuation control. As used herein, a "runtime reload" updates the display while an application is executing based on a current configuration of a number of configuration files that define a format for the display, after the configuration files have been loaded at least once. Reflection, implemented using reflection files, is one way to implement dynamic loading.

The user interface implemented by the system disclosed herein can be changed based on a number of language preferences, functionality, types of control elements, color of backgrounds and fonts, icons, etc. The system disclosed herein contrasts with systems that require a change to the source code, a recompilation, and a recertification whenever there is a change to the user interface. Additionally, the system enables functional code and interface code to be developed independently. That is, changing the functional code does not necessarily impact the interface code and vice versa.

The system includes a graphical user interface engine that pulls in and processes multiple types of configuration files that define the format of the display. The configuration files include view configuration files, layout configuration files, and style configuration files. The system combines complex style inheritance allowing aspects of the style of a control (e.g., from color, rounded corners, etc.) to be inherited with dynamic layout of control elements. The system provides for access to dynamic data values (e.g., telltale indicators such as platform position or fuel flow rate) that can be inserted into a layout file to drive controls dynamically without having to change or recertify underlying control code. A user or user experience team can dynamically use the engine to build displays without shutting the system down.

The system includes a functional code engine that is linked to the graphical user interface engine in order to bind a specific functionality to the elements. In other systems, a developer would create both functional and control element (e.g., widget) code concurrently, such that the control element code is tightly bound to the functional code and such that new controls require new code. In contrast, the present system allows a developer to develop functional code without having any foreknowledge of the control element (e.g., widget) code. Rather, the functional code engine is linked to the graphical user interface engine that implements the code for the control elements to bind the functional aspects of the control elements to the graphical representation of the control elements. Thus, the developers are freed to focus on functional development while user experience teams and users focus on configuring the graphical user interface experience.

The system is applicable in any setting that utilizes a graphical user interface. These application settings include, for example, defense, commercial aerospace, petrochemical, railroad, automotive, and medical equipment. As some examples, the system is deployable to flight deck environments, mission payload operator stations and ground stations.

FIG. 1 is an architecture diagram of a system 100 that implements a dynamically stylable open graphics library. As shown in FIG. 1, the system 100 includes a set 116 of elements 114, the set 116 of elements 114 including elements 1 through N, where N is an integer greater than or equal to 1. The elements 114 are rendered to the graphical user interface (GUI) screen display 118 of the system 100 by the graphical user interface engine 110. The elements 114 include control elements configured to display data or interact with underlying data in response to user input, container elements comprising one or more control elements, sub-control elements that inherit features of a parent control element, sub-container elements that inherit features of a parent container element. The GUI screen display 118 is arranged with various layers that when combined determine where the elements 114 will fit. The elements 114 fit into containers that fit into other containers that may contain graphics or controls. The elements 114 also include a code-controlled state style specified in the style configuration files 106. In some examples, the code-controlled state style includes the features of focus, hover, selected, and action. In some examples, the control elements comprise buttons, radio controls, spin controls, checkboxes, list boxes, text entry items, gauges, and table forms.

The system 100 includes a view layout configuration 101. The view layout configuration 101 includes elements that describe how items and elements are laid out onto the GUI screen display 118. In some examples, the GUI screen display 118 is an LCD screen display. The view layout configuration 101 includes a format 103 that includes a view configuration file 102. The format 103 defines the look and feel of an entire display having a number of functions that are combined to produce the entire display. The view configuration file 102 is a configuration file that defines view format areas of the GUI screen display 118 where elements are placeable within the GUI screen display 118. The view layout configuration 101 also includes a number of components 105. The components 105 provide functionality for the elements 114 of the system 100. In the example shown in FIG. 1, there are K such components 105, where K is an integer greater than or equal to 1. The components 105 include a corresponding layout configuration file 104. The layout configuration files 104 are configuration files that define a layout of the elements 114 within an area described by the view configuration file 102 on the GUI screen display 118.

The system 100 further includes a style cache 108 configured to store and provide access to a number of style configuration files 106. In the example shown in FIG. 1, there are R style configuration files 106, where R is an integer greater than or equal to 1. The style configuration files 106 define a style of the elements. The style of the elements is inherited from a base style or are directly referenced inside of one of the layout configuration files 104. The style of the elements 114 includes a visual appearance. For example, styling includes colors, line widths, background colors, etc. Other examples of styling include font, padding, margin, rounded corners radius, gradient fills, textures, size, positioning, etc. In some examples, the view configuration file 102, the layout configuration files 104, and the style configuration files 106 are implemented in extensible markup language (e.g., in .xml format).

Also included within system 100 and shown in FIG. 1 is a graphical user interface engine 110 and a functional code engine 112. The graphical user interface engine 110 is configured to process and load the style configuration files 106, the layout configuration files 104, and the view configuration file 102 and render the elements 114 onto the GUI screen display 118 in accordance with the view configurations specified by the view configuration file 102, the layout configurations specified by the layout configuration files 104, and the style configurations specified by the style configuration files 106. The functional code engine 112 is linked to the graphical user interface engine 110 to bind a specific component functionality to the elements 114 by matching a functional code for an element 114 to a definition of an element 114 as specified in the view configuration file 102, the layout configuration files 104, and/or the style configuration files 106.

The system 100 also includes a command line interface (CLI) 132. The CLI 132 is a test harness which integrates the GUI screen display 118 for testing purposes. The CLI 132 allows events, such as hardware events, to be injected into the system. The CLI 132 also allows cursor positions to be queried to, for example, obtain information about which elements are selected. Logging into the CLI 132 is implemented in some examples via a remote socket connection. The CLI 132 also allows developers to discover the state of the graphical user interface engine 110. The CLI 132 actively listens for commands via a Transmission Control Protocol (TCP) server socket, and in some examples is compiled out. The CLI 132 receives/takes commands (similar to structured query language (SQL) commands) to inject and query information from the system 100. Example calls that can be made at the CLI 132 include "event selection press", "get button {widget id}", and "query {databoundid}". In some examples, calls are returned via JavaScript Object Notation (JSON). Commands that can be implemented within the CLI 132 include switching screens, pressing and releasing buttons, moving in between elements, auto focusing on an element based on an element ID, querying data bound elements, sending in hardware events, and sending in text into text entry. Implementing the CLI 132 obviates the need for a testing team to do screen scraping for testing and eliminates the need to have information (e.g., identity information and location information) about control elements such as widgets. The testing team can just use the same layout configuration files 104 and style configuration files 106 to call elements 114 by name, which saves a significant amount of testing time (e.g., days of testing time).

The system 100 also includes an event adapter file 136 that describes a mapping of physical controls to events invoked by the physical controls. A hardware event is configured into an application event via the input adapter 134. Application events filter into control elements. A mouse event is an example hardware event 1802. Events received at the CLI 132 are processed by the input adapter 134.

Figure 2:
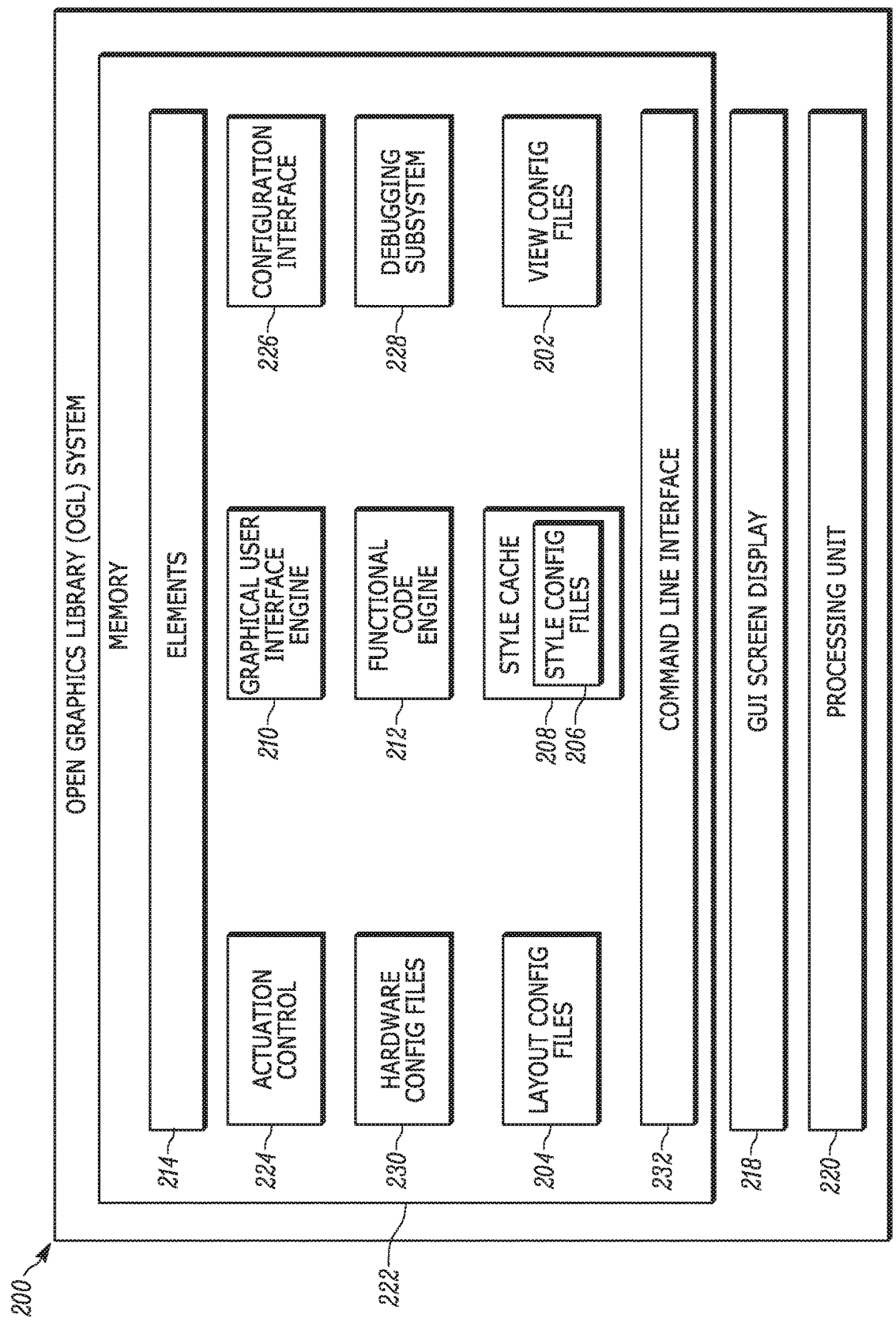
FIG. 2 is block diagram of a system that implements a dynamically stylable open graphics library.

FIG. 2 is block diagram of a system 200 that implements a dynamically stylable open graphics library. The system 200 includes a memory 222 configured to store machine readable instructions and data. The memory 222 can be implemented as volatile memory (e.g., random access memory), non-volatile memory (e.g., flash memory, a solid-state drive, a hard disk drive, etc.) or a combination thereof. The system 200 also includes a processing unit 220 configured to access the memory 222 and execute the machine-readable instructions. The processing unit 220 can be implemented as one or more processor cores.

The machine-readable instructions and data stored by the memory 222 includes various elements 214 that are rendered to the graphical user interface (GUI) screen display 218 of the system 200 by the graphical user interface engine 210. The elements 214 include control elements configured to display data or interact with underlying data in response to user input, container elements comprising one or more control elements, sub-control elements that inherit features of a parent control element, sub-container elements that inherit features of a parent container element. The data stored by the memory 222 also includes one or more style configuration files 206, layout configuration files 204, and view configuration files 202 that define the way information is presented on the GUI screen display 218. The functional code engine 212 is linked to the graphical user interface engine 210 to bind a specific component functionality to the elements by matching a functional code for an element to a definition of an element as specified in the view configuration files 202, the layout configuration files 204, and/or the style configuration files 206.

By changing any of the configuration files (view, layout, and/or style), a user can customize the way information is organized and presented on the GUI screen display 218. Accordingly, the system 200 also includes a configuration interface 226, the configuration interface 226 allowing changes to be made to the style configuration files 206, the layout configuration files 204, and/or the view configuration files 202 by editing a language representative of the format of the configuration files. In some examples, the configuration interface 226 is a text editor.

Included in the machine-readable instructions and data of the memory 222 are the various other modules of the system 200. In particular, the system 200 includes an actuation control 224. Actuating the actuation control 224 by the user during runtime implements a runtime reload of one or more style configuration files 206, layout configuration files 204, and/or view configuration files 202 that have been changed to create a runtime-configured display on the GUI screen display 218. The system 200 further includes a style cache 208 configured to store and provide access to the style configuration files 206. The style configuration files 206 define a style of the elements which in some examples includes a visual appearance. The system 200 also includes a debugging subsystem 228 to implement a dynamic refresh of the view configuration files 202, the layout configuration files 204 and the style configuration files 206. The debugging subsystem 228 allows the user to view a frame rate and grid coordinates on an output terminal such as the GUI screen display 218. The system 200 further includes hardware configuration files 230 that describe a mapping of physical controls to events invoked by the physical controls, such that hardware events are configured into applications events that filter into control elements 214. The system 200 further includes a command line interface 232 interface integrated with the GUI screen display 218, the command line interface 232 being configured to receive commands which inject system events and execute system queries.

Figure 3A:
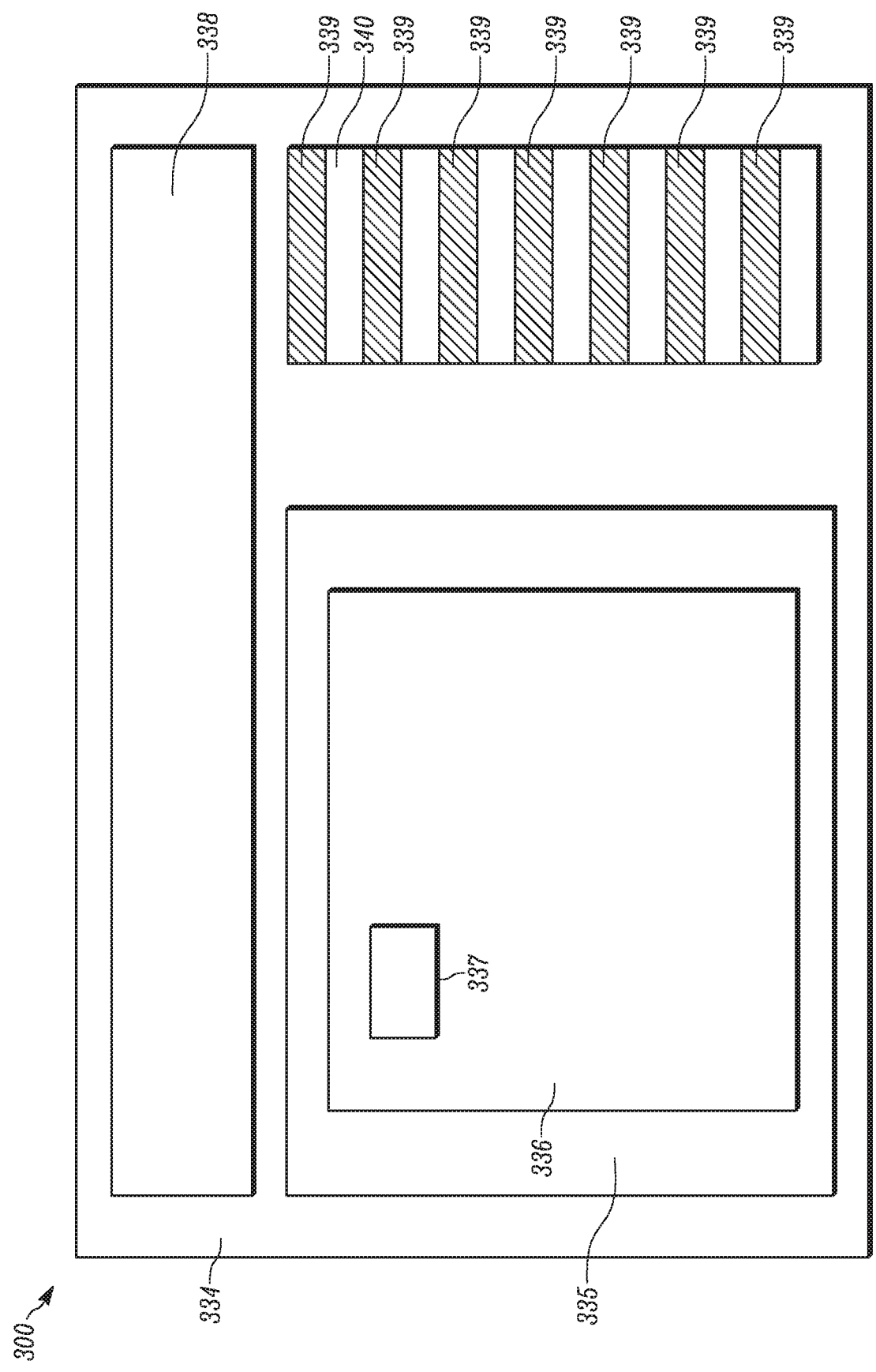
FIG. 3A depicts an example graphical user interface (GUI) screen display.
Figure 3B:
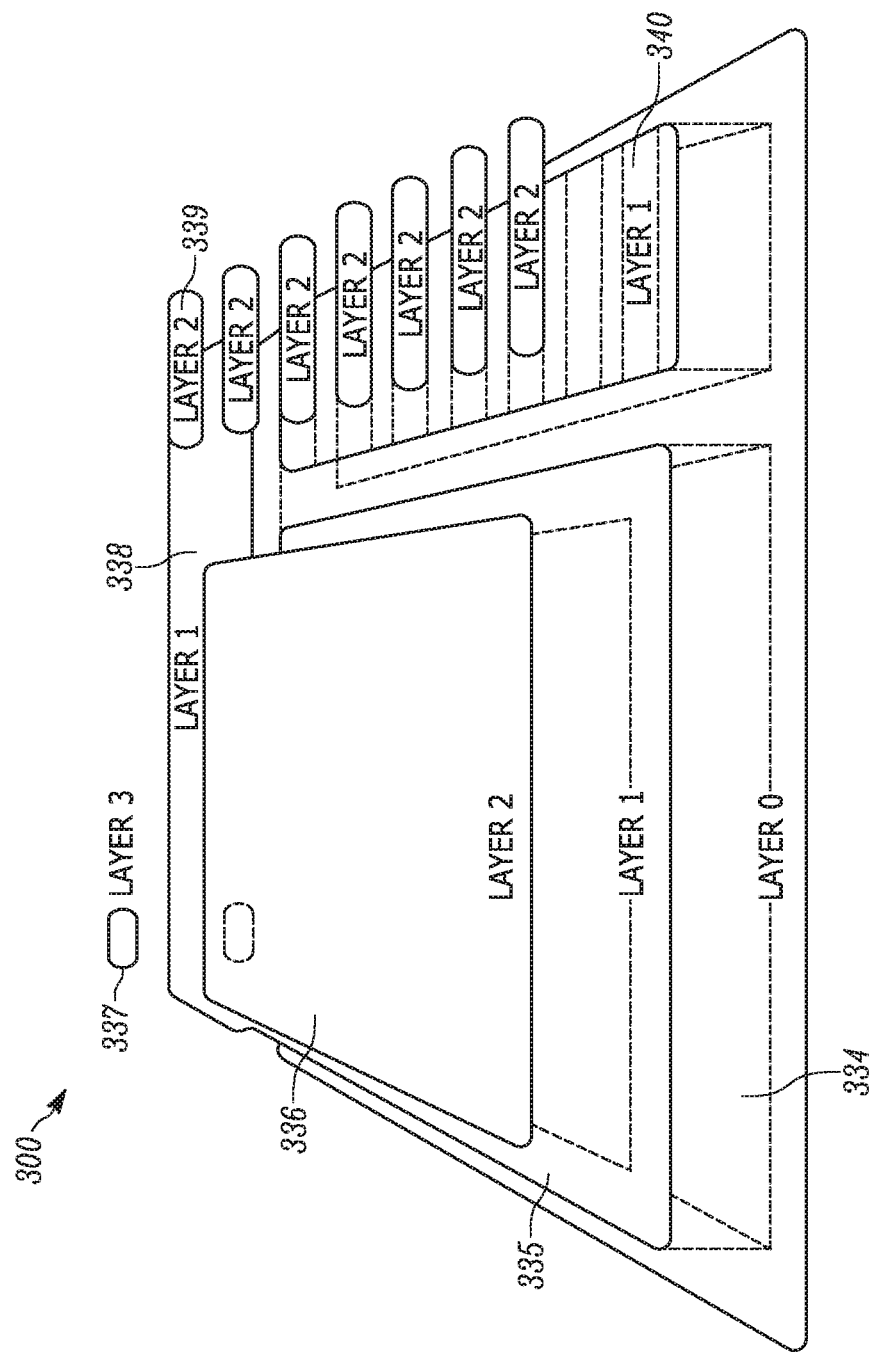
FIG. 3B is an exploded view of the example GUI screen display depicted in FIG. 3A.

FIG. 3A depicts an example graphical user interface (GUI) screen display 300, such as GUI screen display 118 of FIG. 1 or GUI screen display 218 of FIG. 2. Various elements of the GUI screen display 300 are shown. Included among the elements is the overall background 334, control element 337, view area 336, view area background 335, view area 338, indicator elements 334, control element 339, and control element background 340. The GUI screen display 300 appears flat, but the GUI screen display 300 includes a number of layers. FIG. 3B is an exploded view of the GUI screen display 300 depicted in FIG. 3A. FIG. 3B shows that the GUI screen display 300 includes several layers 0-3. Within layer 0 is background 334. Within layer 1 is view area background 335, view area 338, and control element background 340. Within layer 2 is view area 336 and control element 339. Within layer 3 is control element 337. Thus, the GUI screen display 300 is arranged with various layers that when combined provide a layered architecture while specifying where the graphical elements will be placed. Elements fit into containers that fit into other containers that contain graphics or controls. Styling is applied to each of the layers and elements in order to provide colors, widths, background colors, and other style characteristics.

Figure 4:
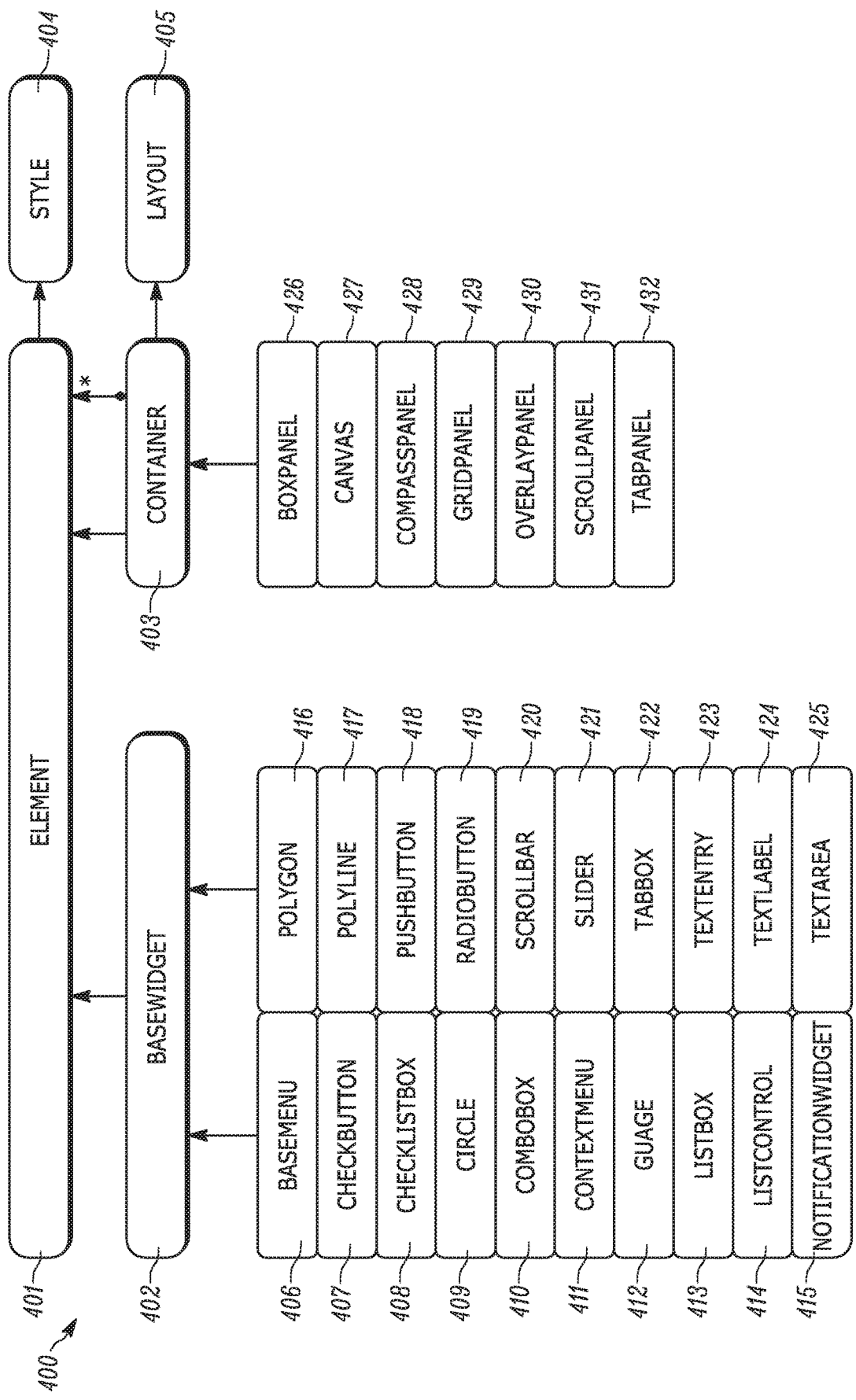
FIG. 4 depicts a high-level organizational view of example elements of a GUI implemented by a dynamically stylable open graphics library.

FIG. 4 depicts a high-level organizational view 400 of example elements 401 of a GUI implemented by a dynamically stylable open graphics library, such as elements 114 of FIG. 1 and/or elements 214 of FIG. 2. Everything on the GUI screen display (such as the GUI screen display 118 or the GUI screen display 218) is a type of element 401. As shown by the organizational view 400 in FIG. 4, elements 401 are either control elements 402 (e.g., widgets) or container elements 403. Container elements 403 define a layout 405 of the elements 401. The control elements 402 (e.g., BaseWidget elements) allow displaying or interacting with data. Each of the elements 401 is styled separately since style 404 is separate from a control or layout. As shown in FIG. 4, among the example control elements 402 is a base menu 406, check button 407, check list box 408, circle 409, combo box 410, context menu 411, gauge 412, list box 413, list control 414, notification widget 415, polygon 416, polyline 417, push button 418, radio button 419, scroll bar 420, slider 421, tab box 422, text entry 423, text label 424, and text area 425. Among the example container elements 403 is a box panel 426, canvas 427, compass panel 428, grid panel 429, overlay panel 430, scroll panel 431, and tab panel 432.

Figure 5:
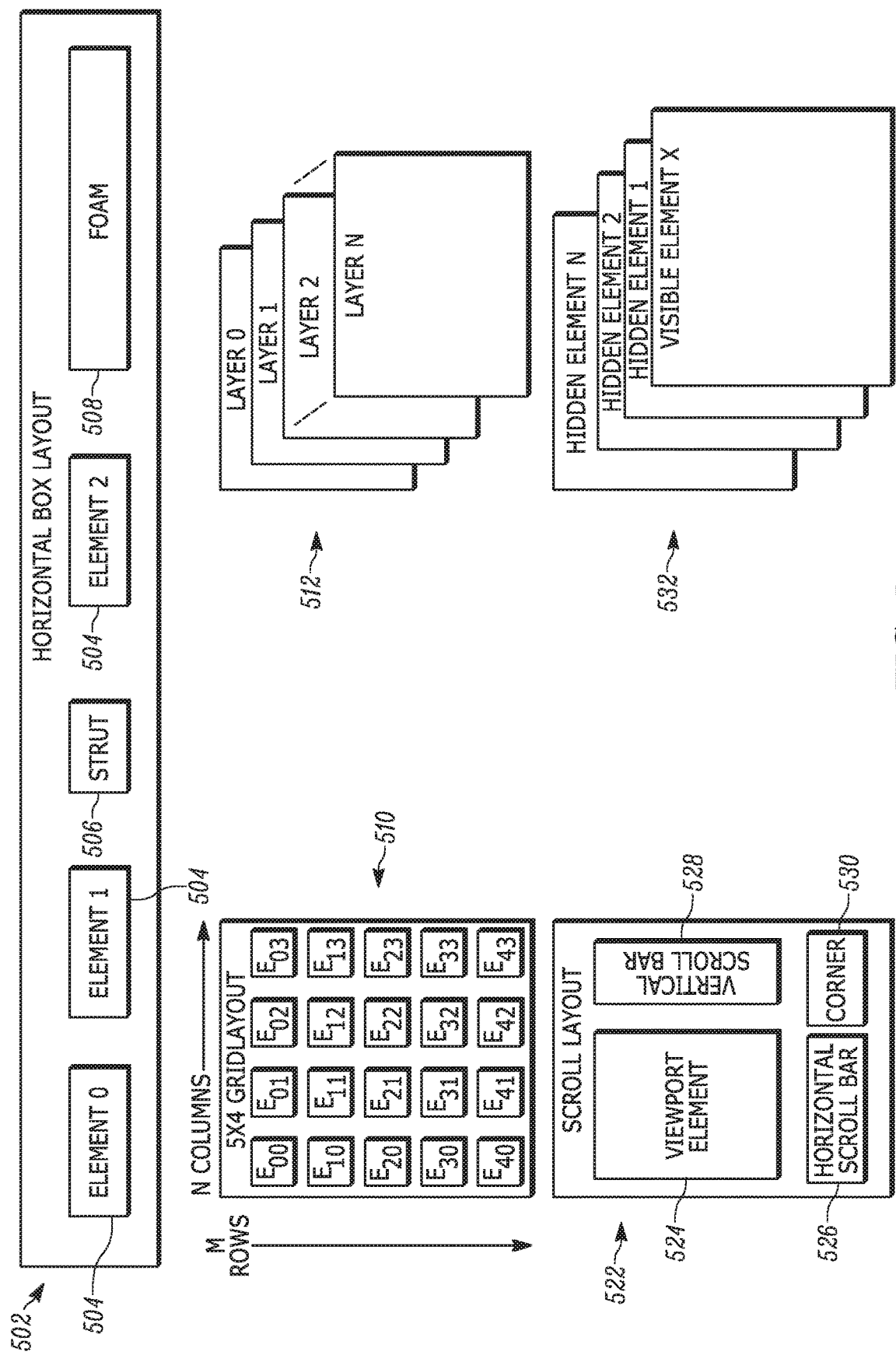
FIG. 5 illustrates various examples of container elements of a GUI implemented by a dynamically stylable open graphics library.

FIG. 5 illustrates various examples of container elements of a GUI implemented by a dynamically stylable open graphics library. The container elements are, for example, a subset of the elements 114 of FIG. 1 and/or the elements 214 of FIG. 2. The horizontal box layout container 502 includes elements 504 (data or control elements), a strut 506 to provide spacing, and foam 508 to provide expandable padding. In some examples, box layout containers are vertical. The grid layout container 510 includes 20 elements ($E_{00}$ to $E_{43}$) arranged in a grid consisting of 5 rows and 4 columns. Grid layout containers can be generalized as containing m rows and n columns such that there are m×n elements. Thus, the grid layout container 510 is laid out from left to right and then from top to bottom in a predefined column/row width. The canvas layout container 512 stacks elements one on top of the other, such as on a map. The canvas layout container 512 includes element layers 0 to n, where n is an integer greater than or equal to 1. The scroll layout container 522 has a fixed size, but when needed provides the ability to grow via a scrollable pane. The scroll layout container 522 includes a viewport element 524 that contains information, a horizontal scroll bar 526, a vertical scroll bar 528, and a corner element 530. The book layout container 532 provides the ability to show one panel at a time, similar to a flipbook. Accordingly, the book layout container 532 includes hidden elements 1 to n (where n is an integer greater than or equal to 1), and a visible element x. In some examples, book layout containers include control with a series of buttons or tabs.

Figure 6:
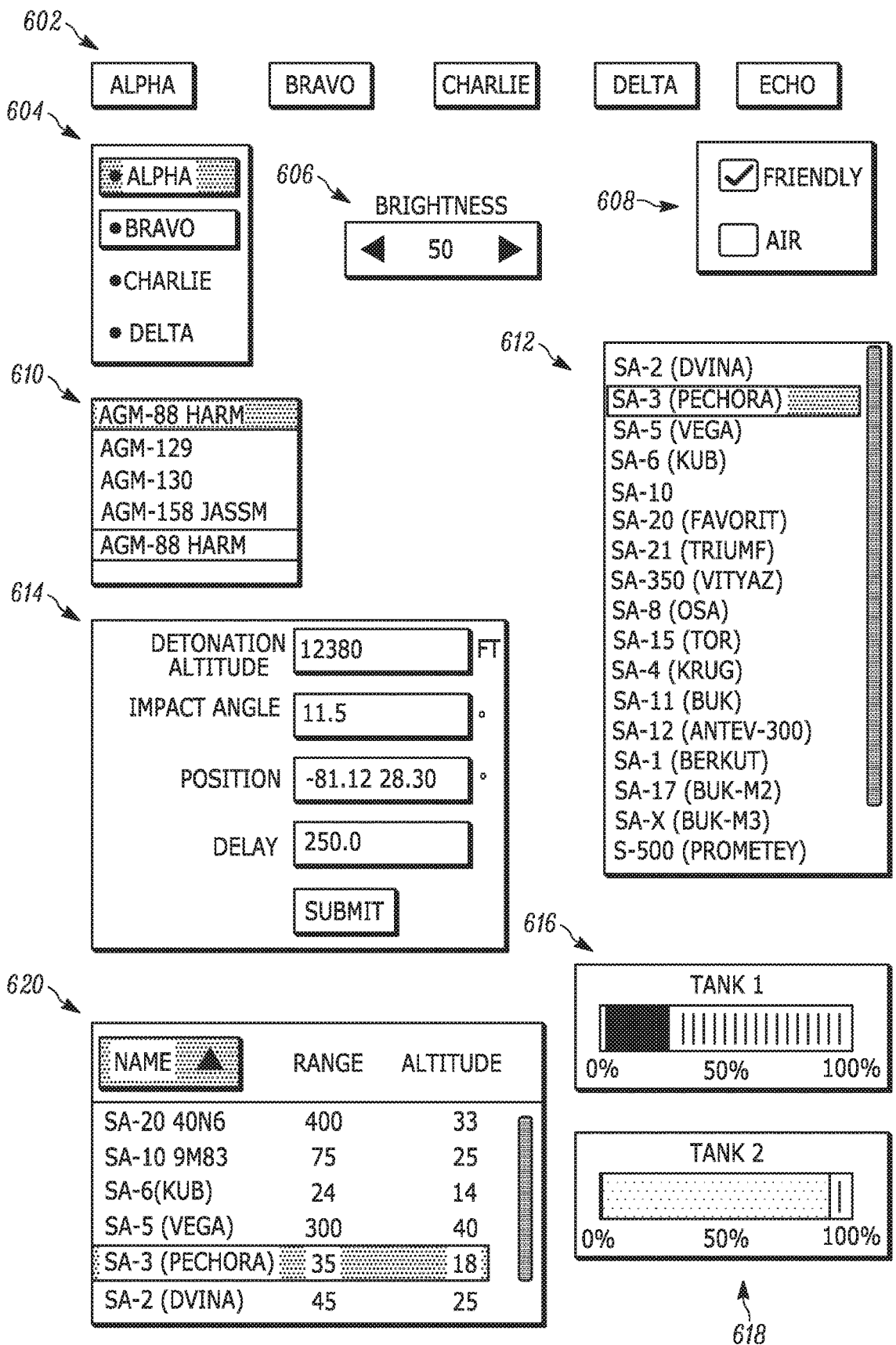
FIG. 6 illustrates various examples of control elements of a GUI implemented by a dynamically stylable open graphics library.

FIG. 6 illustrates various examples of control elements (e.g., widgets) of a GUI implemented by a dynamically stylable open graphics library. The control elements are, for example, a subset of the elements 114 of FIG. 1 and/or the elements 214 of FIG. 2. FIG. 6 depicts control elements that would typically be part of a GUI within a flight deck environment, but in other examples, other control elements could be employed. Shown in FIG. 6 are button control elements 602, a list 604 of radio control elements, a spin control 606, a checkbox 608, a list box 610, another list box 612, a text entry control 614, a gauge element 616 (showing the fuel level for Tank 1), another gauge element 618 (showing the fuel level for Tank 2), and a table form 620.

During the software development process, application development typically implements large application level libraries to create control elements (e.g., widgets) and container elements. Some examples include current versions of 1) Qt (a cross-platform application framework and widget toolkit for creating classic and embedded graphical user interfaces and applications); 2) wxWidgets (a widget toolkit and tools library for creating GUIs for cross-platform applications); 3) Microsoft Foundation Class Library (MFC), a C++ object-oriented library for developing desktop applications for Windows; 4) Java Swing (a GUI widget toolkit for Java); and 5) Gtk (a cross-platform widget toolkit for creating graphical user interfaces). However, use of such application level libraries requires the developer to reconstruct a user experience (UX) designer's vision, which may be imperfect because of lack of attention to details, or the lack of an ability to make user experience enhancements due to feasibility in the framework. Thus, the UX team and the development (DEV) team wait on each other unnecessarily. The systems and methods disclosed herein solve these problems by allowing the developer team to concentrate on functional implementation without regard to layout, style, and design, while allowing the user experience team to concentrate on details such as layout, style, and design permitting the user experience and development teams to work concurrently yet independently. Thus, members of the UX team use the same engine (e.g., the graphical user interface engine 110 of FIG. 1) to generate user interface mockups (for example, to generate the list of control elements requiring functionality, the mockup functioning as a draft GUI). The UX team then hands the generated mockup to the development team to integrate functionality while the UX team independently finalizes the formatting and visual aspects of the GUI.

Figure 7:
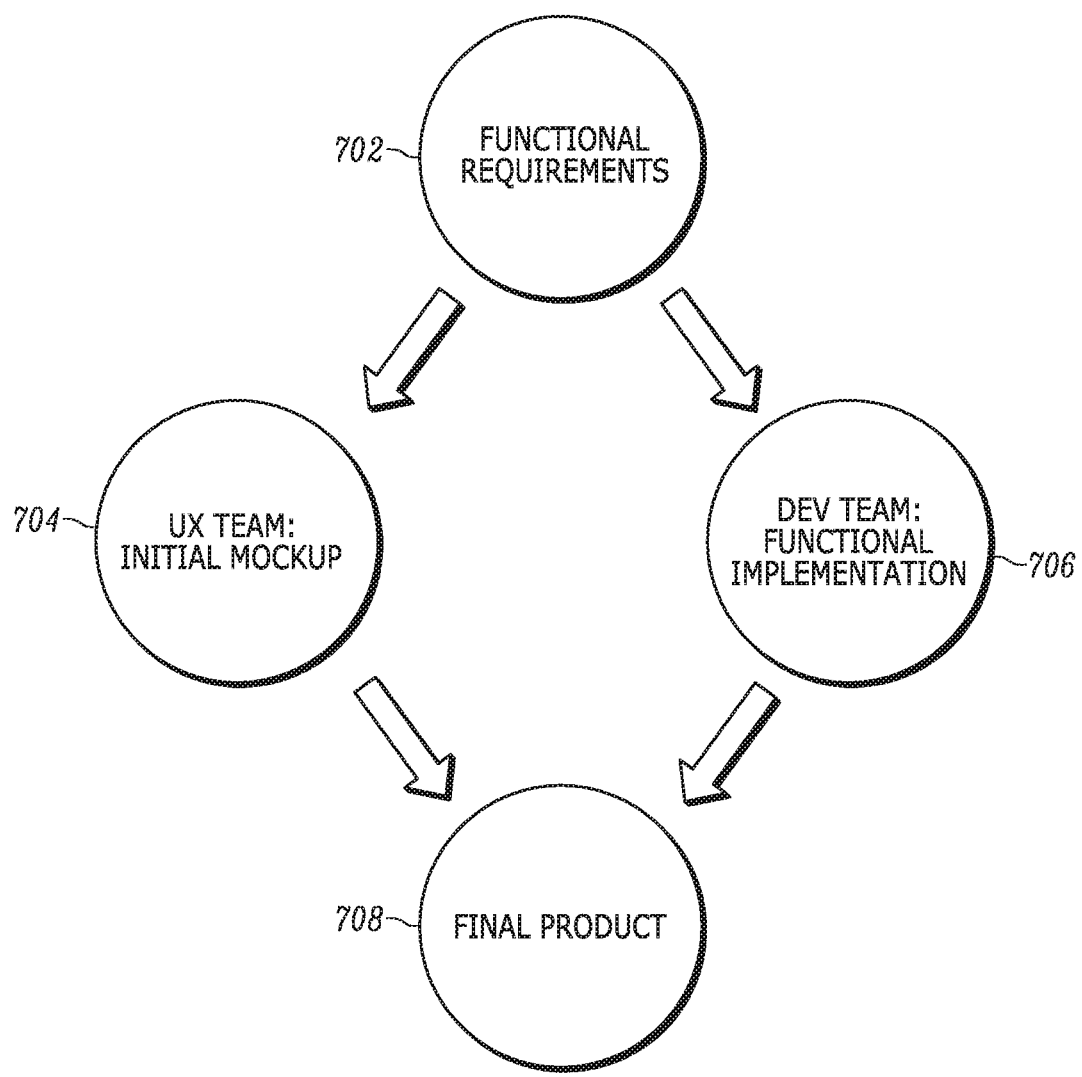
FIG. 7 illustrates a software/embedded application process for implementing a dynamically stylable open graphics library.

FIG. 7 thus illustrates a software/embedded application process for implementing a dynamically stylable open graphics library enabled by the systems and methods disclosed herein. At 702, functional requirements are gathered. At 704, the user experience (UX) team performs an initial mockup of a GUI screen display and other aspects of the user interface. At about the same time (e.g., the times overlap) that the user experience team generates a mockup, at 706, the development team is developing the functional implementation. At 708, the mockup from the user experience team is combined with the functional implementation developed by the development team to produce the final GUI OpenGL product. The software platforms listed above (including Qt, wxWidgets, MFC, Java Swing, and Gtk) should be adapted such that software/embedded application development can occur in accordance with the process illustrated by FIG. 7. Accordingly, the systems and method described herein create a dynamic layout and dynamically stylable OpenGL based engine that allows a UX team and a DEV team to work together. The system is cross-platform, and in some examples utilizes the C++ programming language. The system allows runtime configuration including updates to the graphical user interface when the system is executing. As indicated with respect to FIG. 1 and FIG. 2, the system includes three types of configuration files, including style configuration files, layout configuration files, and one or more view configuration files. The style configuration files determine the visual appearance of the elements on the display depending on a state. The layout configuration files determine the layout for control elements (e.g., widgets). The layouts are conformed to a proper space within an overall view, as determined by a view configuration file. The view configuration files describe areas where a layout can be placed within an overall screen space.

Figure 8A:
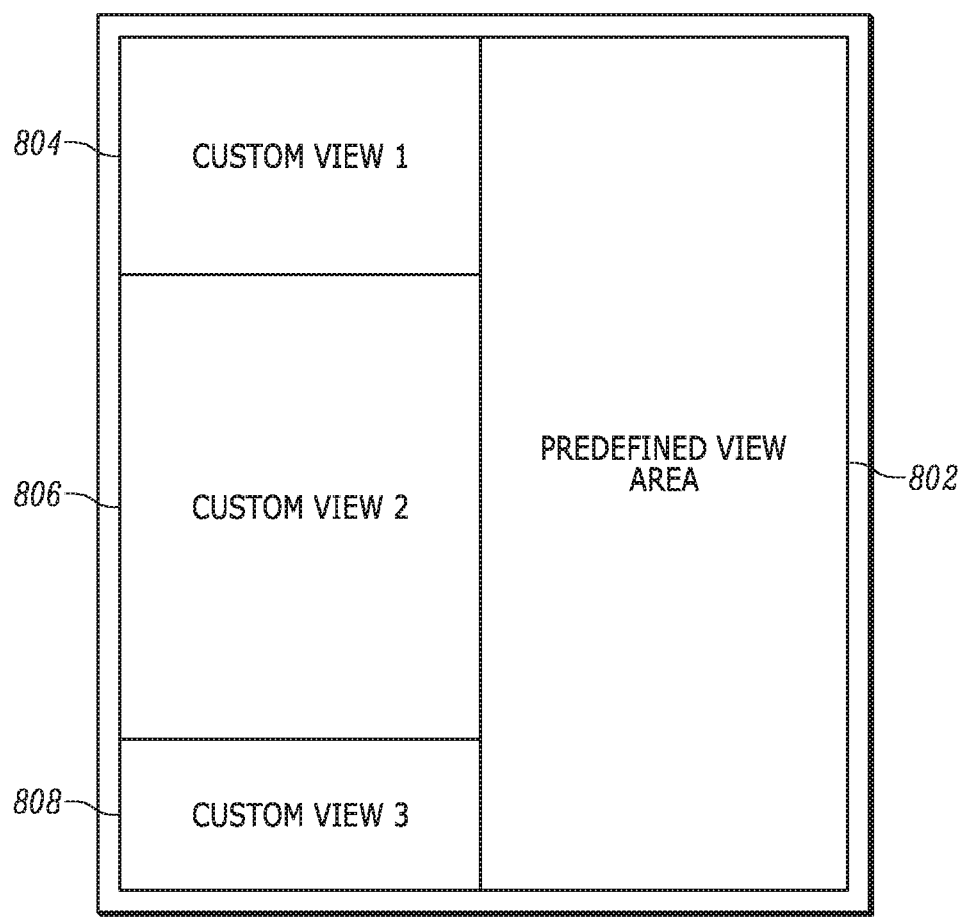
FIG. 8A depicts example views of a GUI implemented by a dynamically stylable open graphics library.

FIG. 8A depicts example views of a GUI implemented by a dynamically stylable open graphics library, such as the views within the view layout configuration 101 of FIG. 1, and view area 336 and view area 338 of FIGS. 3A-3B. Views ae relative windows where layouts and control elements (e.g., widgets) are placed. Views are similar to frames in HTML. A view provides a space for a layout to hook into. Some views are predefined while other views are customizable. Multiple layouts use views in a cyclical manner. FIG. 8A shows a predefined view 802, as well as three custom views, namely custom view 1 804, custom view 2 806, and custom view 3 808. Views, therefore, are sub-areas on the GUI screen display (e.g., GUI screen display 118 and/or GUI screen display 218) where layout configuration files are bounded and determine a layout. Views, taken in combination, make up a format or complete display area. The GUI screen display displays elements within a view at a given time depending on the specification provided by the view layout configuration (e.g., the view layout configuration 101) determined by the view configuration file or layout configuration files.

Figure 8B:
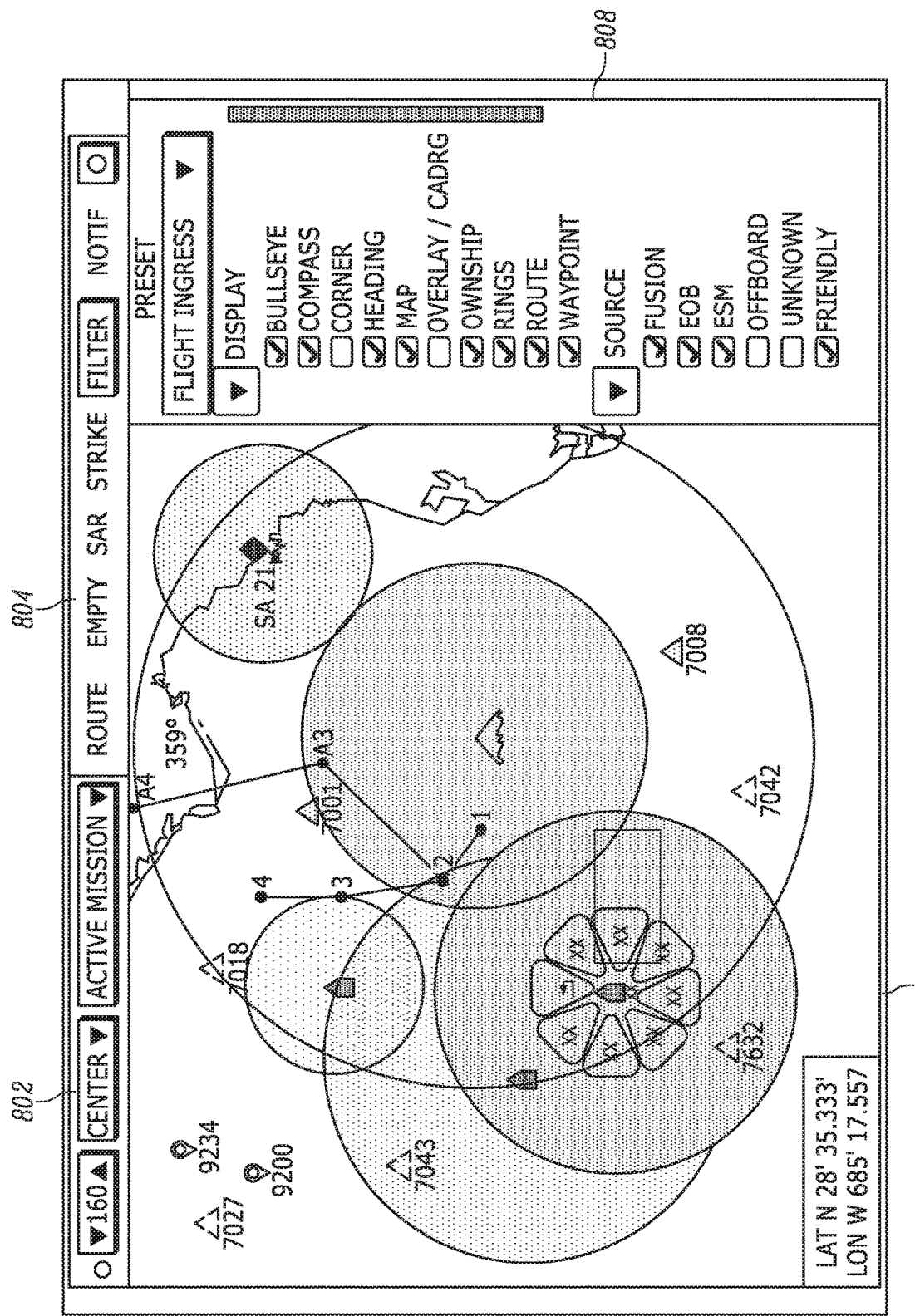
FIG. 8B depicts different view areas for an example flight deck application implemented with a dynamically stylable open graphics library.

FIG. 8B depicts different view areas for an example flight deck application implemented with a dynamically stylable open graphics library. For purposes of simplification of explanation, FIG. 8B employs the same reference numbers as FIG. 8A to denote an instantiation of a view area in the flight deck application. FIG. 8B depicts four view areas. View are 802 is the main area view slot (e.g., the main area for the format). View area 804 is the menu slot allowing the user to select from a variety of different layouts. View area 806 is the map area view slot which provides a map of interest. View area 808 is the gutter area, which is a ribbon-like area for various contextual based layouts.

FIG. 9A is an example style file 900 for a dynamically stylable open graphics library. The style file 900 controls the style and state of elements within a layout. The style file 900 defines a base control style for a button, beginning at 902 ("Button Style Start") and ending at 904 ("Button Style End"). The style file 900 allows styling of the smallest elements (e.g., a "sub style") within a control element (e.g., the drop arrow in a ComboBox). In some examples, styles inherit from a base style. In other examples, styles are directly referenced inside of a layout file or are inherited by a control type. For example, a button takes the base style "button", or alternatively, takes on a style specified in a layout file. FIG. 9B is an example style file 925 that produces a control button 930 containing the text "BRAVO". Control button 930 is a control element. The style file 925 specifies various aspects of the control button 930, including as the button's color at 931, that the button has rounded corners of a particular radius at 932, the font type at 933, the emphasis at 934, the font size of the text "BRAVO" at 935, and the alignment 936 of the text "BRAVO" within the button. FIG. 9C is an example style file 950 that produces two check buttons, check button 960 and check button 962. Among other specifications, the style file 950 specifies that the check button 962 is disabled (disabled is an example state style), at 963, and unchecked (unchecked is also an example state style), at 964. FIG. 9D is an example style file 975 that specifies aspects of an example spin control 980. Among the aspects specified by the style file 975 include the overall aspects of the spin control 980 beginning at 981, the focus portion of the spin control 980 beginning at 982, and the arrow portion of the spin control 980 beginning at 983. The system allows every element to be stylable.

Figure 10:
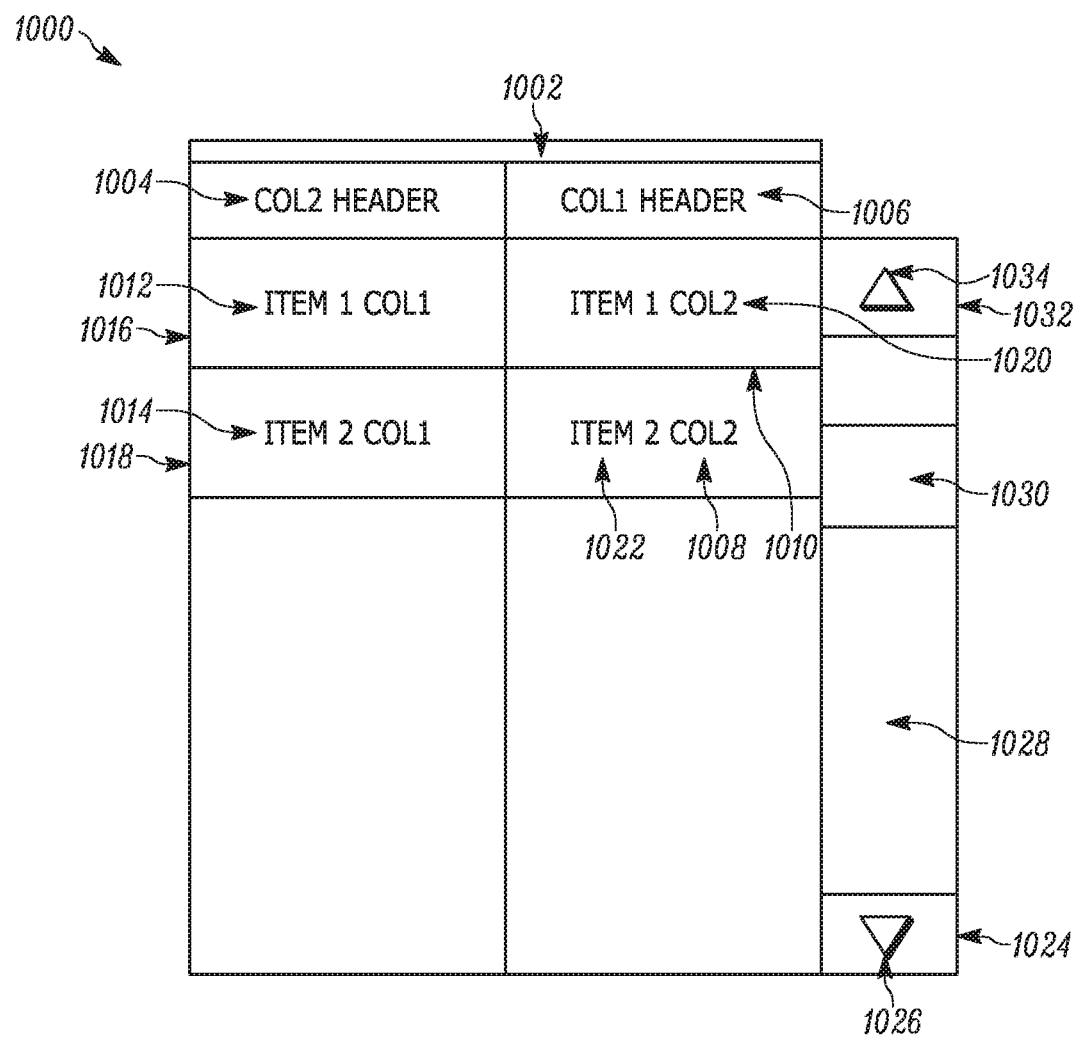
FIG. 10 depicts an example list control element of a GUI implemented by a dynamically stylable open graphics library.

FIG. 10 depicts an example list control element 1000 of a GUI produced by a style file of a dynamically stylable open graphics library. The list control element 1000 (corresponding to a programming object, e.g., listCtrl) is composed of several sub-elements. The list control element 1000 includes a header element 1002 corresponding to a programming object, e.g., listCtrl.header. The list control element 1000 includes two-tab elements corresponding to programming objects, e.g., listCtrl.headerTab1 and listCtrl.headerTab2). The list control element 1000 includes tab element 1004 ("Col2 Header") and tab element 1006 ("Col1 Header"). The list control element 1000 includes four cell elements corresponding to programming objects, e.g., listCtrl.itemCell1, listCtrl.itemCell2, listCtrl.itemCell3, and listCtrl.itemCell4, namely cell element 1008, cell element 1010, cell element 1012, and cell element 1014. The list control element 1000 includes four item elements corresponding to programming objects, e.g., listCtrl.item1, listCtrl.item2, listCtrl.item3, and listCtrl.item4, within each of the four cell elements, namely item element 1016, item element 1018, item element 1020, and item element 1022. The list control element 1000 includes a down button 1024 enabling downward vertical scrolling, and which corresponds to a programming object, e.g., listCtrl.scrollVert.downButton. The list control element 1000 includes a down arrow 1026 corresponding to a programming object, e.g., listCtrl.scrollVert.downButton.arrow, on the down button 1024. The list control element 1000 includes a vertical scroll area 1028 corresponding to a programming object, e.g., listCtrl.scrollVert. The list control element 1000 includes a scroll bar handle 1030 corresponding to a programming object, e.g., listCtrl.scrollBar.handle. The list control element 1000 includes an up button 1032 enabling upward vertical scrolling, corresponding to a programming object, e.g., listCtrl.scrollVert.upButton. The list control element 1000 includes an up arrow 1034 corresponding to a programming object, e.g., listCtrl.scrollVert.upButton.arrow on the up button 1032.

The list control element 1000 is stylable as are each of the named sub-elements within the list control element 1000. Moreover, each of the elements and sub elements have corresponding code-controlled state style. Examples of state styles are focus, hover, selected, action, etc. Example styles include font, padding, margin, rounded corners radius, colors, gradient fills, textures, size, positioning, etc.

Figure 11:
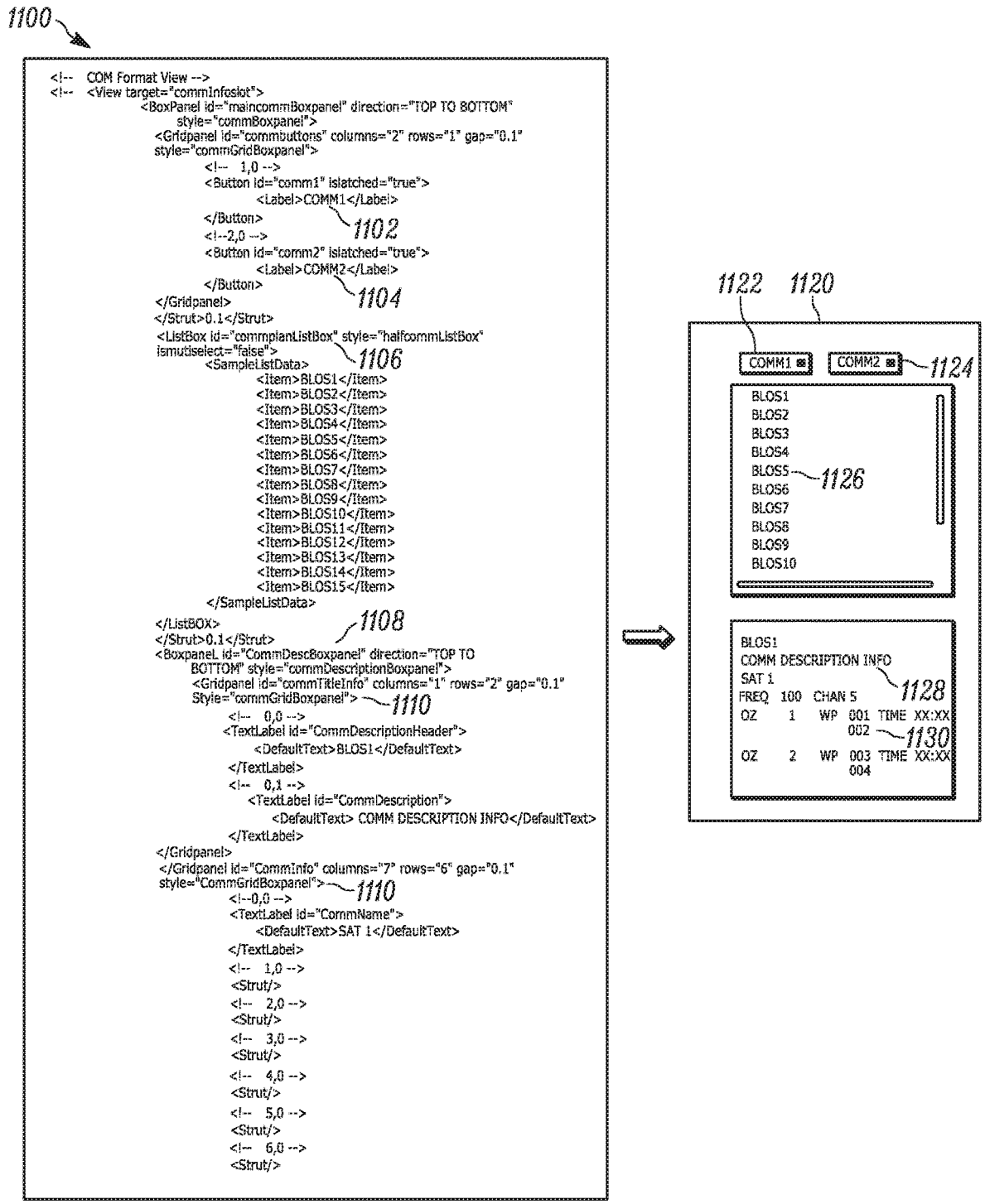
FIG. 11 is an example layout file of a dynamically stylable open graphics library and view area generated by the layout file.

FIG. 11 is an example layout configuration file 1100 and view area 1120 generated by the layout configuration file 1100. The layout configuration file 1100 defines how various elements are shown within the view area 1120 of a GUI screen display. In FIG. 11, the layout configuration file 1100 specifies, at 1102 and 1104, that two communications buttons appear at the top of the view area 1120, namely communication button 1122 and communication button 1124. Further, the layout configuration file 1100 specifies, at 1106, that a vertically and horizontally scrollable list box 1126 has several "BLOS" items situated below the communication button 1122 and the communication button 1124. The layout configuration file 1100 further specifies, at 1108 and 1110, respectively, that below the list box 1126, data is displayed both as a description box panel 1128 and as a grid box panel 1130. The layout configuration files, such as the layout configuration file 1100, control the layout of a view inside of a format. Control elements, such as widgets, and static content are added to containers and layout panels in order to dynamically control layouts. Elements can either inherit their style or have their style specified directly. Data can be statically filled or property files can be used to fill data fields (so that they can be reused across multiple layouts). Databinding is used to pull variable data directly from the system and have the data update dynamically. The layout configuration files, such as the layout configuration file 1100, generate control elements (e.g., widgets) such that the standard containers and controls are generated and used by changing any one of the view configuration files, the layout configuration files, or the style configuration files. This allows a user experience (UX) team to take a layout configuration file create a display by just changing the layout configuration file on the fly, and then actuating a "hotkey" to actuate a runtime load (or runtime reload) of the GUI screen display to view a refreshed display (e.g., updates to the control elements). After the layout configuration file is created, the layout configuration file (e.g., an xml file) can be immediately used by the development (DEV) team to connect the user experience with the functionality that has been written on the backend by the development team.

Figure 12:
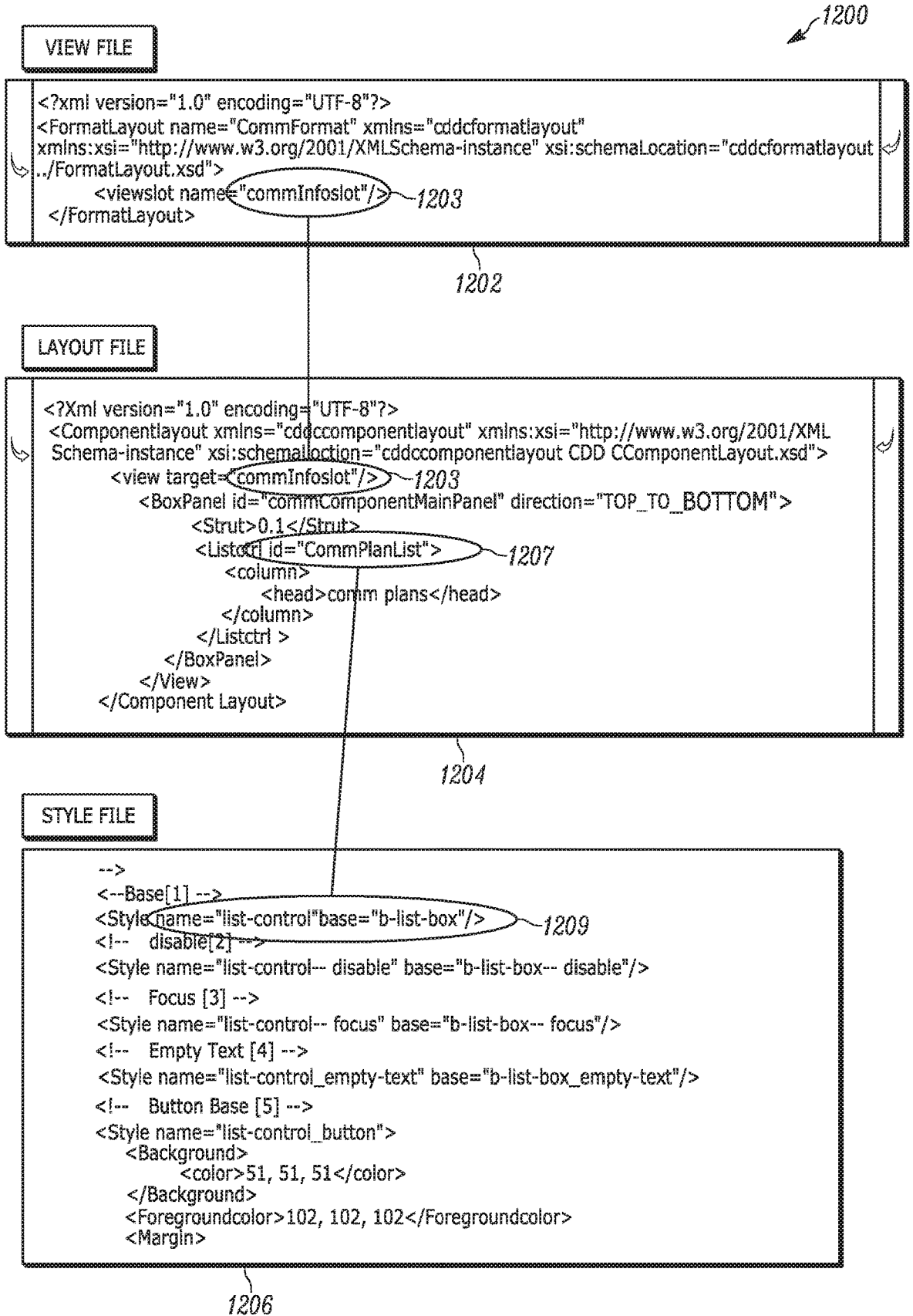
FIG. 12 illustrates an example linking of a view configuration file, a layout configuration file, and a style configuration file by a system implementing a dynamically stylable open graphics library.

FIG. 12 illustrates an example linking 1200 of a view configuration file 1202, a layout configuration file 1204, and a style configuration file 1206 by a system implementing a dynamically stylable open graphics library. The commInfoSlot object 1203 is specified in the view configuration file 1202 by the statement:
<ViewSlot name="commInfoSlot"/
The commInfoSlot object 1203 is used again in the layout configuration file 1204 to indicate a layout format. Further, layout configuration file 1204 specifies a layout format of the list control element by the statement:
<ListCtrl id="CommPlanList">
Further, the style configuration file 1206 specifies the style of the list control by the statement:
<Style name="list-control" base=b-list-box"/>
The CommPlanList object 1207 indicates the layout of the list control element. In the example shown in FIG. 12, the list control element inherits the base b-list-box style since a specific style is not specified in the style configuration file 1206. If a style tag is added to the list control in the style configuration file 1206 at 1209 the style is set to something other than the base style, namely that indicated by the style tag. The component layout describes a view target. If multiple layouts are assigned to a view then the display works out the contention.

The system described herein (e.g., the system 100 and/or the system 200) can be implemented in a cross-platform manner using any general-purpose programming language such as C++. In some examples, the system implements abstraction layers so that no operating system specific calls are made. Also, in some examples, supporting software libraries are also cross-platform. Example supporting libraries that can be used are Geospatial Data Abstraction Library (GDAL), Geometry Engine Open Source (GEOS), Simple DirectMedia Layer (SDL), Shapelib, and Xerces. The graphics code is developed using a cross-language, cross-platform application programming interface, such that the development team is a level of abstraction away from graphics code unless a specialty item is required. In some examples, data input is based on Open Mission Standard (OMS) messages.

By using the system disclosed herein, developers can create control elements (e.g., widgets) either in code or force control elements into the display through direct code calls. Similarly, developers can create styles in code or force styles into the display through direct code calls. The system disclosed herein provides a one for one translation of elements (container elements, control elements) in layout configuration files, and a one for one translation of style objects in style configuration files.

Figure 13:
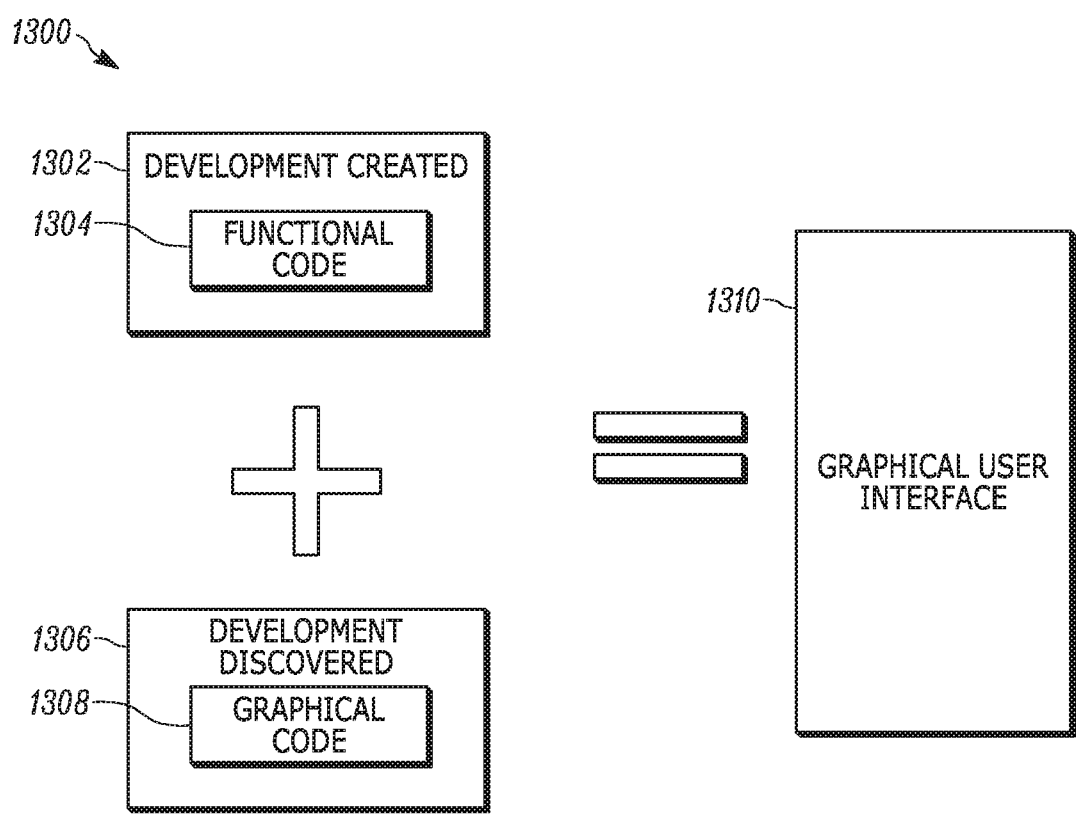
FIG. 13 an illustration of the separation of functional code and graphical code to implement a graphical user interface in accordance with the teachings disclosed herein.

FIG. 13 an illustration 1300 of the separation of functional code 1304 and graphical code 1308 to implement a graphical user interface 1310 in accordance with the teachings disclosed herein. Functional code 1304 is created 1302 by a development team. Simultaneously but separately, graphical code 1308 is developed by a separate team (e.g., a user experience team) and then discovered 1306 by the development team to generate the graphical user interface 1310. This paradigm stands in contrast to previous approaches where a development team would be needed to develop both the functional code 1304 and the graphical code 1308 to develop the graphical user interface 1310. By using the system (e.g., system 100 and/or system 200) described herein, the functional developers do not need foreknowledge of graphical code 1308 (style, view, or layout), because the control elements are discovered 1306. The functional code 1304 is then linked to the graphical code 1308 (e.g., by linking a functional code engine (e.g., functional code engine 112 or functional code engine 212) with a graphical user interface engine (e.g., graphical user interface engine 110 or graphical user interface engine 210)), which allows functional development to be kept separate from user experience development.

In the system disclosed herein, functional code is bound to graphical code using a binding process. To bind the functional code to the graphical code, the system declares the universe of control elements that need to be bound to functional code. A bind command is then executed to match each control element with a named control in a layout file. Then, controls for events are registered. If the control element does not exist then a control element is created internally but not put into any container (effectively making it offscreen), such that they are no null pointers. All of the controls do not necessarily have to be declared in code. Rather, control elements that include functionality (e.g., those specified by the developer) are bound. The style files are used for styling the control elements (which in some examples is programmatically controlled).

The binding process also includes feeding data to the control elements. The system provides the ability to expose data elements from inside the system to allow a user experience team to add new descriptive fields or change the kind of data that is displayed. Data binding provides a way to expose internal data objects to user experience developers as well as linkages that allow developers to add dynamic content to layouts. Developers can expose methods or member variables through reflection to the user experience developers, and control elements can be linked together in layout configuration files.

FIG. 14 illustrates example 1400 data binding syntax for a dynamically stylable open graphics library system. Data is set within control elements using a data attribute to an object exposed in code. Thus, in FIG. 14, the SARTaskList list control element is set through the sub-statement 1402 --data="SARTasks"--. A "key" attribute declares the data element used as the key for the list. Thus, in FIG. 14, the SARTaskList list control element is assigned through the sub-statement 1404 --uuidKey="m_id.uuid"--. Other elements in the layout file can call the list variable by name followed by the data method or item needed to be filled out. All dynamic fields are prepended by ${data:}. Thus, the SARTaskList object corresponding to a list control element is dynamic as specified by the statement 1406: <DefaultText>${data:SARTaskList.Selected.TaskStateString}</DefaultText>. The list control element corresponding to SARTaskList is bound 1408 via the ${data:} statement 1406.

FIG. 15 illustrates an example reflection file 1500 used within a dynamically stylable open graphics library system. The reflection file 1500 corresponds to a SARTask element. The reflection file 1500 provides the ability to implement structural and behavioral changes during runtime, or for observing and modifying program execution at runtime. Accordingly, the system disclosed herein supports reflection, which automatically handles updates to data. Some programming languages provide direct support for reflection (e.g., C# and JAVA) while other programming languages (e.g., C++) do not provide direct support for reflection. In languages where reflection is not directly supported, the developer has to choose what is exposed (with optional description), and developers have to have an overloaded ostream operator (e.g., toString) for each custom method unless it exists for basic types. The developer benefits in that they can give over full control of an object over to a control element rather than having to pull data from an object and insert it into a list. Smart pointers are implemented to delete pointers that do not have corresponding objects associated with them.

Figure 16:
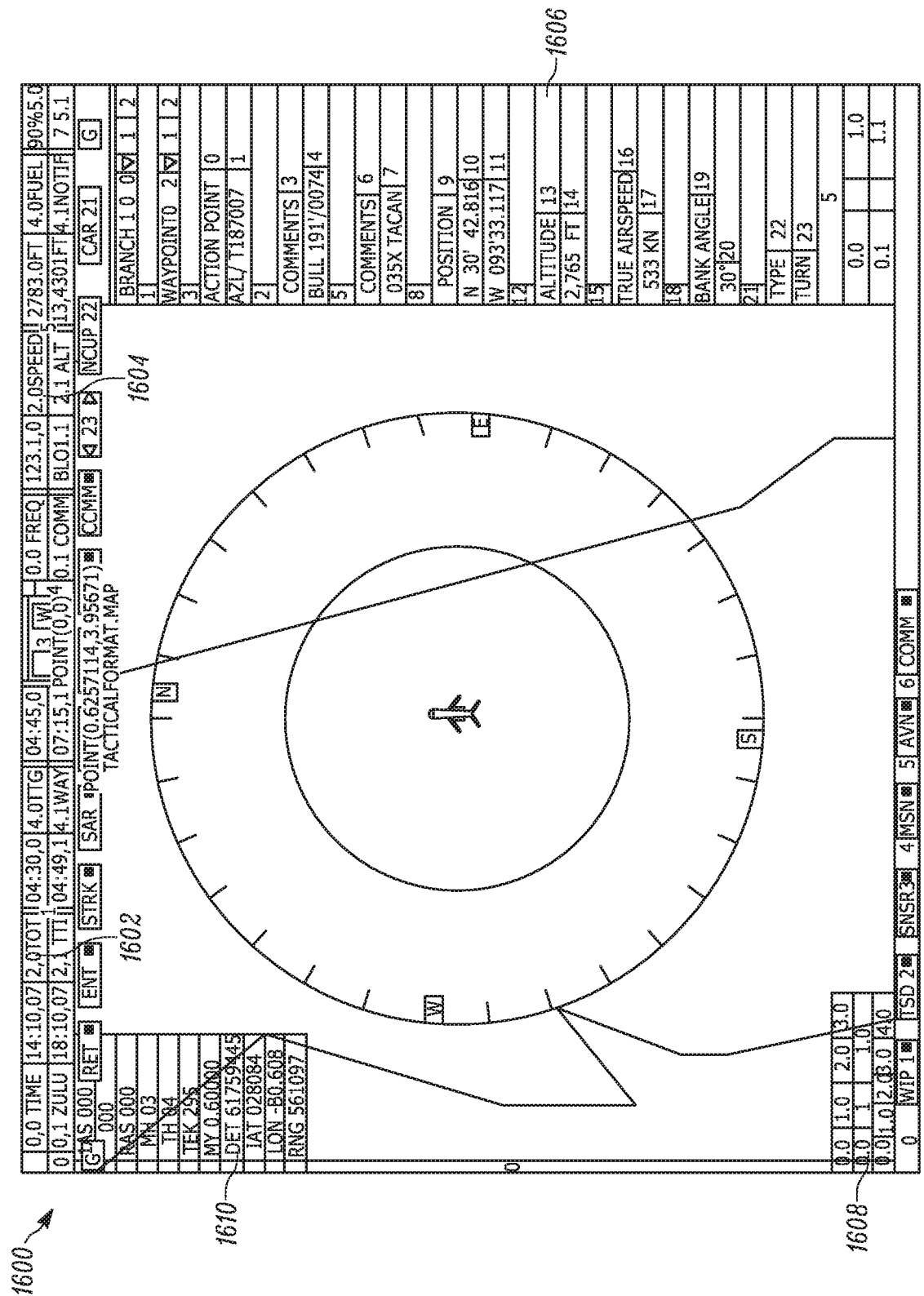
FIG. 16 is an example debug view of a dynamically stylable open graphics library system.

FIG. 16 is an example debug view 1600 of the dynamically stylable open graphics library system. Container layouts can be viewed while in debug mode. While in debug view 1600 with highlighted container layouts (in some examples, the container layouts are shown in different colors in debug view), including container layout 1602, container layout 1604, container layout 1606, container layout 1608, and container layout 1610. A debugging subsystem (e.g., debugging subsystem 228) is used to implement a dynamic refresh of the configuration files, including the view configuration files, the layout configuration files and the style configuration files. As a practical example, the debugging subsystem can be used to view a frame rate (e.g., by actuating a hotkey) and grid coordinates on the screen. In some examples, the dynamic refresh of all of the configuration files is tied to a hotkey, which allows a runtime switch to a debugging mode and updates all of the files so that a development team and a user experience team can instantly see any changes to the configuration files. While in debugging mode, grid coordinates follow a cursor and provide an indication of which control element the cursor is presently hovering over.

FIG. 17 is an example property file 1700 used by the disclosed dynamically stylable open graphics library system. Other features of the system are the inclusion of message bundles and property files. Message bundles and property files are used so that layout configuration files are not overloaded with the same strings. Property files are implemented for quick text replacement.

Figure 18:
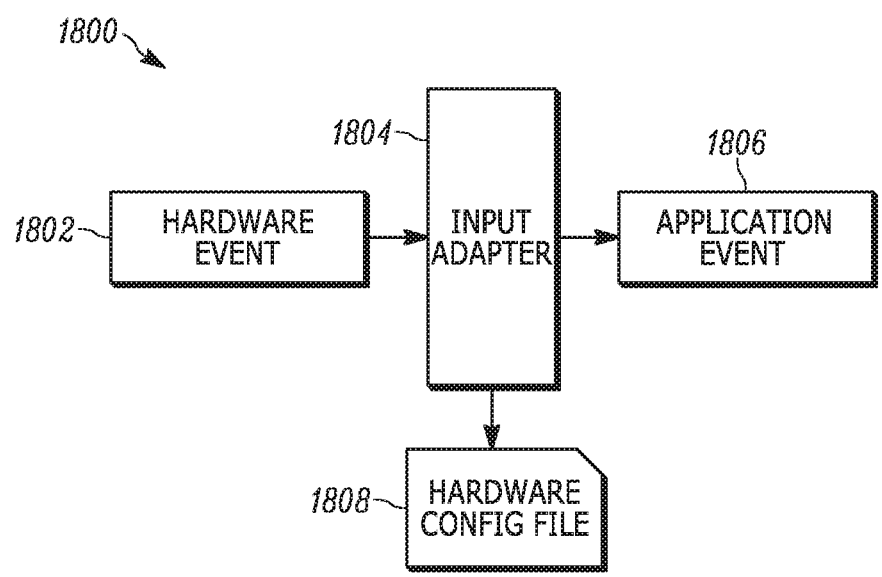
FIG. 18 is a block diagram illustrating an example hardware interface subsystem implemented by the disclosed dynamically stylable open graphics library system.

FIG. 18 is a block diagram illustrating a hardware interface subsystem 1800 implemented by the disclosed dynamically stylable open graphics library system. The hardware interface subsystem 1800 configures hardware events into application events. The hardware interface subsystem 1800 includes a hardware configuration file 1808 that describes a mapping of physical controls to events invoked by the physical controls. The hardware event 1802 is configured into an application event 1806 via the input adapter 1804. The input adapter 1804 and hardware configuration file 1808 correspond to the input adapter 134 and event adapter file 136, respectively, of FIG. 1. The application event 1806 filters into control elements. A mouse event is an example hardware event 1802. Adapters (such as input adapter 1804) can be written for custom controllers (such as flight controls) and can be dynamically mapped to application events (such as application event 1806). Other example application events include widget traversal, cursor movement, joystick control, and focus events etc. Furthermore, pipeline configuration files allow the system to dynamically reconfigure hardware events in order to quickly test various keymappings, with the developer being unaware of the mappings.

Figure 19:
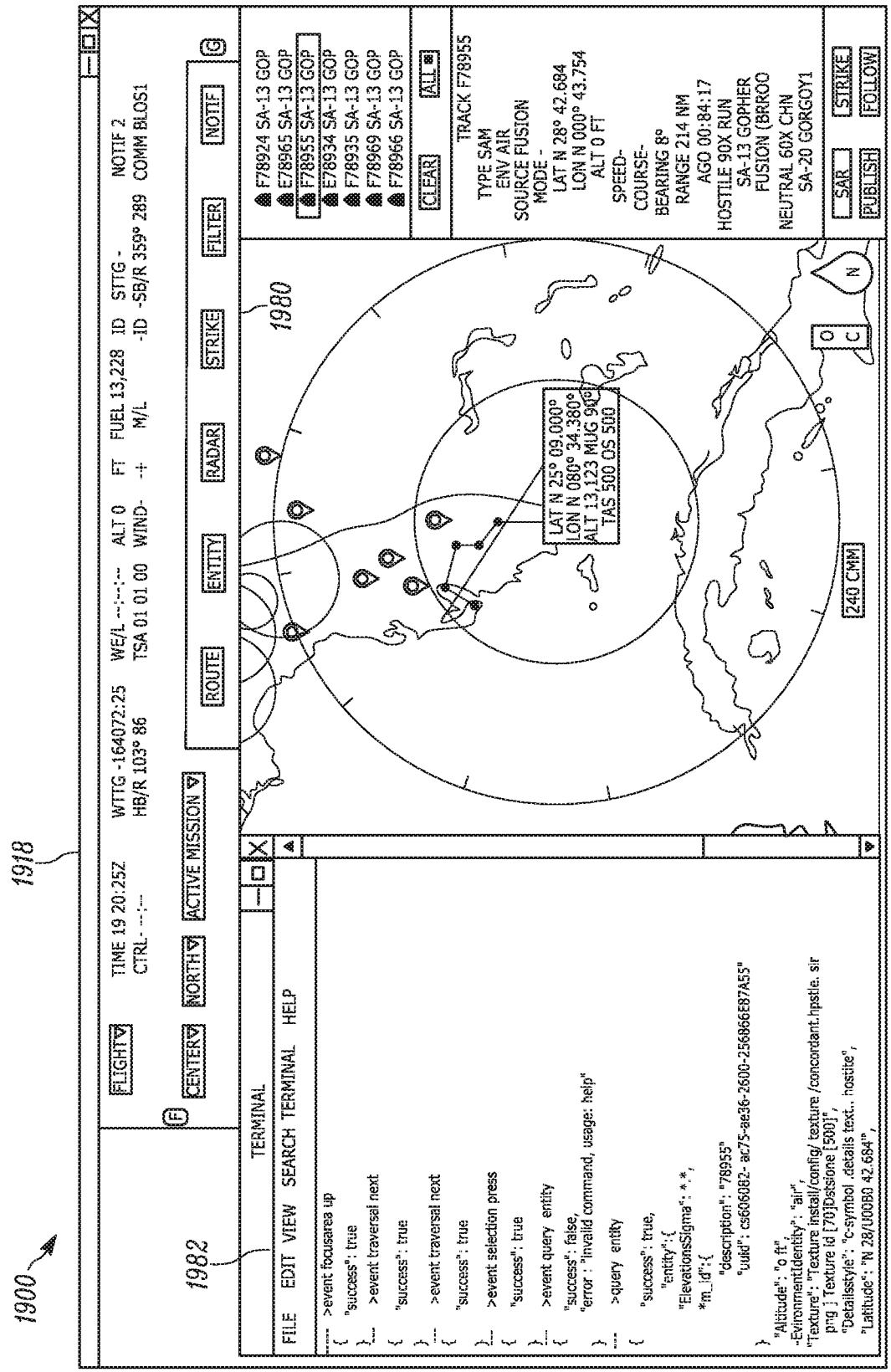
FIG. 19 depicts an example command line interface (CLI) session.

FIG. 19 depicts an example command line interface (CLI) session 1900. In FIG. 19, a command line interface (CLI) (such as the command line interface 132 shown in FIG. 1 and the command line interface 232 shown in FIG. 2) controls the interaction with the GUI screen display 1918. The JavaScript Object Notation (JSON) terminal 1982 shows the status of various commands and queries entered into the CLI. The session 1900 of FIG. 19 shows 1) focusing of an area 1980 on the GUI screen display 1918, 2) moving to the next chained element (a button), 3) moving to another chained button, 4) selecting the button, and 5) then a query entity queries the system to determine which entity is actually currently selected, which is shown on the JSON 1982.

Figure 20:
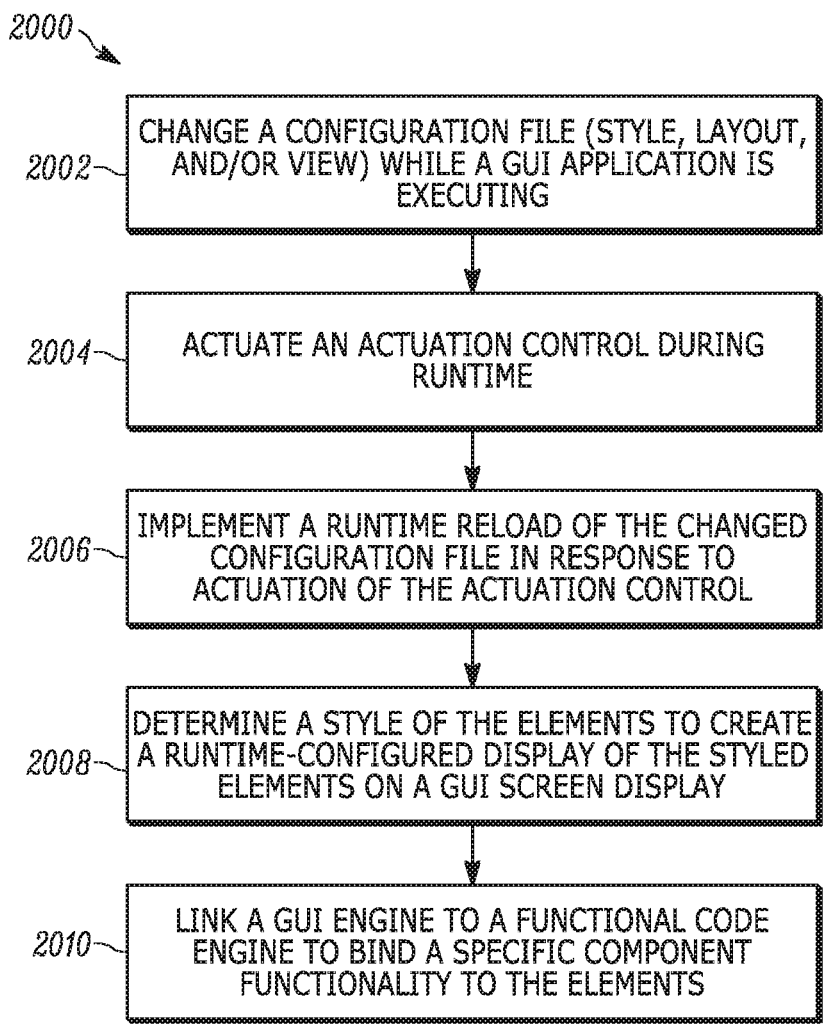
FIG. 20 is a flowchart implementing a method of a dynamically stylable open graphics library for dynamically changing elements within a graphical user interface (GUI) during runtime.

FIG. 20 is a flowchart 2000 of a method for dynamically changing elements within a graphical user interface (GUI) during runtime. At 2002, a style configuration file (e.g., one of style configuration files 106 or style configuration files 206), a layout configuration file (e.g., one of layout configuration files 104 or layout configuration files 204), or a view configuration file (e.g., view configuration file 102 or one of view configuration files 202) is changed while a GUI application is executing. As mentioned regarding system 100 and system 200, the view configuration file defines view format areas of the graphical user interface where elements (e.g., elements 114 or elements 214) are placeable, the layout configuration file defines a layout of the elements within an area described by the view configuration file on the graphical user interface, and the style configuration file defines the style of the elements. At 2004, an actuation control (e.g., actuation control 224) is actuated (e.g., by a user) during runtime. The actuation control is, for example, a hotkey, keyboard shortcut, or biometric recognition interface.

At 2006, a runtime reload of the style configuration file, the layout configuration file, or the view configuration file that has been changed is implemented in response to actuation of the actuation control. At 2008, a style of the elements is determined to create a runtime-configured display of styled elements on a GUI screen display (e.g., GUI screen display 118, GUI screen display 218, and/or GUI screen display 300). Determining the style of the elements at 2008 includes, in some examples, inheriting the style of the elements from a base style, and applying the inherited style to the elements. Determining the style of the elements at 2008 also includes, in some examples, referencing the style of the elements directly inside of a layout file, and applying the referenced style to the elements. At 2010, GUI engine is linked to a functional code engine to bind a specific component functionality to the elements by matching a functional code for an element to a definition of an element as specified in the view configuration file, the layout configuration file, and/or the style configuration file. The elements of the graphical user interface include control elements configured to display data or interact with underlying data in response to user input, container elements comprising one or more control elements, sub-control elements that inherit features of a parent control element, and sub-container elements that inherit features of a parent container element.

What have been described above are examples. It is not possible to describe every conceivable combination of components or methodologies. Many further combinations and permutations are possible. Accordingly, the disclosure is intended to embrace all such alterations, modifications, and variations that fall within the scope of this application, including the appended claims. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system to implement a dynamically stylable open graphics library, comprising:
    a memory configured to store machine readable instructions and data;
    a processing unit configured to access the memory and execute the machine-readable instructions, the machine-readable instructions and data comprising:
        a view configuration file that defines view format areas of a graphical user interface to display a first set of elements;
        a layout configuration file that defines a layout of the first set of elements within an area described by the view configuration file on a screen display;
        a style configuration file that defines a style of the first set of elements;
        a graphical user interface engine configured to:
            process the style configuration file, the layout configuration file, and the view configuration file;
            render the first set of elements onto the screen display during a runtime; and
            provide a command line interface integrated with the screen display that is configured to receive commands and output data characterizing a status of the received commands;
        a configuration interface, the configuration interface configured to generate a second set of elements during the runtime in response to a user initiated change to the style configuration file, the layout configuration file, and the view configuration file via the command line interface, wherein the graphical user interface renders the second set of elements onto the screen display during the runtime;
        a functional code engine that is linked to the graphical user interface engine, wherein the functional code engine monitors a state of the graphical user interface engine via the command line interface and binds specific component functionality to the first and second set of elements in response to instantiation of the first and second set of elements being detected by the functional code engine via the command line interface;
        an actuation control, wherein actuating the actuation control during runtime implements a runtime load of the style configuration file, the layout configuration file, and the view configuration file that have been changed in response to the user initiated change to create a runtime-configured display on the screen display; and
        a debugging subsystem used to implement a dynamic refresh of the style configuration file, layout configuration file and the view configuration file in response to actuating the actuation control to view a frame rate and grid coordinates on the graphical user interface and identify the user initiated change to the style configuration file, layout configuration file and the view configuration file, wherein the grid coordinates follow a cursor and provide an indication of the first and second set of elements that the cursor hovers over.

2. The system of claim 1, wherein the first and second set of elements of the graphical user interface comprise:
    control elements configured to display data or interact with underlying data in response to user input;
    container elements comprising one or more control elements;
    sub-control elements that inherit features of a parent control element; and
    sub-container elements that inherit features of a parent container element.

3. The system of claim 2, wherein the control elements comprise buttons, radio controls, spin controls, checkboxes, list boxes, text entry items, gauges, and table forms.

4. The system of claim 1, further comprising a style cache configured to store a plurality of style configuration files.

5. The system of claim 1, wherein the style of the first and second set of elements is inherited from a base style or are directly referenced inside of the layout configuration file, and comprises a visual appearance.

6. The system of claim 1, wherein the first and second set of elements comprise a code-controlled state style specified in the style configuration file, and wherein the code-controlled state style comprises focus, hover, selected, or action, and wherein styles of the first and second set of elements include font, padding, margin, corners radius, colors, gradient fills, size, and positioning.

7. The system of claim 1, wherein the command line interface is configured to inject system events, execute system queries and provide the state of the graphical user interface in response to the received commands.

8. The system of claim 1, further comprising hardware configuration files that describe a mapping of physical controls to events invoked by the physical controls, wherein hardware events are configured into applications events that filter into control elements.

9. A method for dynamically changing elements within a graphical user interface (GUI) during a runtime, the method comprising:
  implementing a runtime load of a style configuration file, a layout configuration file, or a view configuration file to determine a first set of elements to display on a GUI display screen via a GUI application;
  rendering the first set of elements onto the screen display during a runtime;
  providing a command line interface integrated with the screen display that is configured to receive commands and output data characterizing a status of the received commands;
  changing the style configuration file, the layout configuration file, and the view configuration file via the command line interface while the GUI application is executing during the runtime in response to a user initiated change;
  actuating an actuation control during the runtime;
  implementing a runtime reload of the style configuration file, the layout configuration file, and the view configuration file that has been changed in response to actuation of the actuation control in response to the user initiated change to create a runtime-configured display on the GUI display screen;
  determining a second set of elements to create and render the runtime-configured display of the second set of elements on the GUI display screen;
  linking a graphical user interface engine to a functional code engine to monitor a state of the graphical user interface engine and bind a specific component functionality to the first and second set of elements, in response to the functional code engine detecting instantiation of the first and second set of elements, by matching a functional code for an element to a definition of an element as specified in the view configuration file, the layout configuration file, and the style configuration file via the command line interface; and
  instantiating a debugger subsystem to implement a dynamic refresh of the style configuration file, layout configuration file and the view configuration file in response to actuating the actuation control to view a frame rate and grid coordinates on the graphical user interface and identify the user initiated change to the style configuration file, layout configuration file and the view configuration file, wherein the grid coordinates follow a cursor and provide an indication of the first and second set of elements that the cursor hovers over.

10. The method of claim 9, wherein the view configuration file defines view format areas of the graphical user interface where the first and second set of elements are placeable, the layout configuration file defines a layout of the first and second set of elements within an area described by the view configuration file on the graphical user interface, and the style configuration file defines the style of the first and second set of elements.

11. The method of claim 9, wherein the first and second set of elements of the graphical user interface comprise:
  control elements configured to display data or interact with underlying data in response to user input;
  container elements comprising one or more control elements;
  sub-control elements that inherit features of a parent control element; and
  sub-container elements that inherit features of a parent container element.

12. The method of claim 9, wherein determining the first and second set of elements comprising a method, the method comprising:
  inheriting the style of the first and second set of elements from a base style; and
  applying the inherited style to the first and second set of elements.

13. The method of claim 9, wherein determining the first and second set of elements comprising a method, the method comprising:
  referencing the style of the first and second set of elements directly inside of a layout file; and
  applying the referenced style to the first and second set of elements.

14. A non-transitory computer readable medium, comprising:
  a view configuration file that defines view format areas of a graphical user interface to display a first set of elements;
  a layout configuration file that defines a layout of the first set of elements within an area described by the view configuration file on a screen display;
  a style configuration file that defines a style of the first set of elements;
  a graphical user interface engine configured to:
    process the style configuration file, the layout configuration file, and the view configuration file;
    render the first set of elements onto the screen display during a runtime; and
    provide a command line interface integrated with the screen display that is configured to receive commands and output data characterizing a status of the received commands;
  a configuration interface, the configuration interface configured to generate a second set of elements during the runtime in response to a user initiated change to the style configuration file, the layout configuration file, and the view configuration file via the command line interface, wherein the graphical user interface renders the second set of elements onto the screen display during the runtime;
  an actuation control, wherein actuating the actuation control during runtime is configured to implement a runtime load of the style configuration file, the layout configuration file, and the view configuration file that have been changed via the command line interface to generate a second set of elements that are rendered onto the screen display during the runtime;
  a functional code engine that is linked to the graphical user interface engine, wherein the functional code engine monitors a state of the graphical user interface engine via the command line interface and binds specific component functionality to the first and second set of elements in response instantiation of the first and second set of elements being detected by the functional code engine via the command line interface; and
  a debugging subsystem used to implement a dynamic refresh of the style configuration file, layout configuration file and the view configuration file in response to actuating the actuation control to view a frame rate and grid coordinates on the graphical user interface and identify the user initiated change to the style configuration file, layout configuration file and the view configuration file, wherein the grid coordinates follow a cursor and provide an indication of the first and second set of elements that the cursor hovers over.

15. The medium of claim 14, wherein the first and second set of elements of the graphical user interface comprise:
control elements configured to display data or interact with underlying data in response to user input;
container elements comprising one or more control elements;
sub-control elements that inherit features of a parent control element; and
sub-container elements that inherit features of a parent container element.

16. The system of claim 1, wherein the runtime reload is executed without a recompilation of the GUI engine.

* * * * *